United States Patent
Baldwin et al.

(10) Patent No.: US 9,105,266 B2
(45) Date of Patent: Aug. 11, 2015

(54) SYSTEM AND METHOD FOR PROCESSING MULTI-MODAL DEVICE INTERACTIONS IN A NATURAL LANGUAGE VOICE SERVICES ENVIRONMENT

(71) Applicant: VOICEBOX TECHNOLOGIES CORPORATION, Bellevue, WA (US)

(72) Inventors: Larry Baldwin, Maple Valley, WA (US); Chris Weider, Seattle, WA (US)

(73) Assignee: VoiceBox Technologies Corporation, Bellevue, WA (US)

( * ) Notice: Subject to any disclaimer, the term of this patent is extended or adjusted under 35 U.S.C. 154(b) by 0 days.

(21) Appl. No.: 14/278,645

(22) Filed: May 15, 2014

(65) Prior Publication Data

US 2014/0249822 A1    Sep. 4, 2014

Related U.S. Application Data

(63) Continuation of application No. 13/692,451, filed on Dec. 3, 2012, now Pat. No. 8,738,380, which is a continuation of application No. 12/389,678, filed on Feb. 20, 2009, now Pat. No. 8,326,637.

(51) Int. Cl.
*A61C 5/14* (2006.01)
*G10L 15/18* (2013.01)
(Continued)

(52) U.S. Cl.
CPC ............ *G10L 15/1815* (2013.01); *G06Q 30/02* (2013.01); *G06Q 30/0241* (2013.01); *G10L 15/18* (2013.01); *G10L 15/22* (2013.01); *G10L 15/24* (2013.01); *G10L 2015/223* (2013.01)

(58) Field of Classification Search
CPC .......... G06Q 30/0251; G06Q 30/0242; G06Q 30/0259; G06Q 30/0261; G10L 15/00; G10L 15/19; G10L 15/1815; G10L 15/08; G06F 17/2785; G06F 17/30864; G06F 17/30976
USPC ............... 704/1–10, 231, 251, 255, 257, 270, 704/277, 270.1, 235; 705/14.54; 707/5
See application file for complete search history.

(56) References Cited

U.S. PATENT DOCUMENTS

| 4,430,669 A | 2/1984 | Cheung | 358/122 |
| 4,821,027 A | 4/1989 | Mallory et al. | 340/521 |

(Continued)

FOREIGN PATENT DOCUMENTS

| EP | 1 320 043 A2 | 6/2003 |
| EP | 1 646 037 | 4/2006 |

(Continued)

OTHER PUBLICATIONS

Reuters, "IBM to Enable Honda Drivers to Talk to Cars", Charles Schwab & Co., Inc., Jul. 28, 2002, 1 page.

(Continued)

*Primary Examiner* — Huyen Vo
(74) *Attorney, Agent, or Firm* — Pillsbury Winthrop Shaw Pittman LLP

(57) ABSTRACT

A system and method for processing multi-modal device interactions in a natural language voice services environment may be provided. In particular, one or more multi-modal device interactions may be received in a natural language voice services environment that includes one or more electronic devices. The multi-modal device interactions may include a non-voice interaction with at least one of the electronic devices or an application associated therewith, and may further include a natural language utterance relating to the non-voice interaction. Context relating to the non-voice interaction and the natural language utterance may be extracted and combined to determine an intent of the multi-modal device interaction, and a request may then be routed to one or more of the electronic devices based on the determined intent of the multi-modal device interaction.

20 Claims, 4 Drawing Sheets

(51) Int. Cl.
*G06Q 30/02* (2012.01)
*G10L 15/24* (2013.01)
*G10L 15/22* (2006.01)

(56) References Cited

U.S. PATENT DOCUMENTS

| | | | |
|---|---|---|---|
| 4,829,423 A | 5/1989 | Tennant et al. | 364/200 |
| 4,910,784 A | 3/1990 | Doddington et al. | 381/43 |
| 5,027,406 A | 6/1991 | Roberts et al. | 381/43 |
| 5,155,743 A | 10/1992 | Jacobs | 375/28 |
| 5,164,904 A | 11/1992 | Sumner | 364/436 |
| 5,208,748 A | 5/1993 | Flores et al. | 364/419 |
| 5,274,560 A | 12/1993 | LaRue | 364/444 |
| 5,357,596 A | 10/1994 | Takebayashi et al. | 395/2.84 |
| 5,377,350 A | 12/1994 | Skinner | 395/600 |
| 5,386,556 A | 1/1995 | Hedin et al. | 395/600 |
| 5,424,947 A | 6/1995 | Nagao et al. | 364/419.08 |
| 5,471,318 A | 11/1995 | Ahuja et al. | 358/400 |
| 5,475,733 A | 12/1995 | Eisdorfer et al. | 379/52 |
| 5,488,652 A | 1/1996 | Bielby et al. | 379/88 |
| 5,499,289 A | 3/1996 | Bruno et al. | 379/220 |
| 5,500,920 A | 3/1996 | Kupiec | 395/2.79 |
| 5,517,560 A | 5/1996 | Greenspan | 379/114 |
| 5,533,108 A | 7/1996 | Harris et al. | 379/201 |
| 5,537,436 A | 7/1996 | Bottoms et al. | 375/222 |
| 5,539,744 A | 7/1996 | Chu et al. | 370/60 |
| 5,557,667 A | 9/1996 | Bruno et al. | 379/201 |
| 5,559,864 A | 9/1996 | Kennedy, Jr. | 379/59 |
| 5,563,937 A | 10/1996 | Bruno et al. | 379/201 |
| 5,577,165 A | 11/1996 | Takebayashi et al. | 395/2.84 |
| 5,590,039 A | 12/1996 | Ikeda et al. | 395/759 |
| 5,608,635 A | 3/1997 | Tamai | 364/449.3 |
| 5,617,407 A | 4/1997 | Bareis | 369/275.3 |
| 5,633,922 A | 5/1997 | August et al. | 379/220 |
| 5,634,086 A | 5/1997 | Rtischev et al. | 395/2.79 |
| 5,652,570 A | 7/1997 | Lepkofker | 340/573 |
| 5,675,629 A | 10/1997 | Raffel et al. | 379/58 |
| 5,696,965 A | 12/1997 | Dedrick | 395/610 |
| 5,708,422 A | 1/1998 | Blonder et al. | 340/825.34 |
| 5,721,938 A | 2/1998 | Stuckey | 395/754 |
| 5,722,084 A | 2/1998 | Chakrin et al. | 455/551 |
| 5,740,256 A | 4/1998 | Castello Da Costa et al. | 361/94.7 |
| 5,742,763 A | 4/1998 | Jones | 395/200.3 |
| 5,748,841 A | 5/1998 | Morin et al. | 395/2.66 |
| 5,748,974 A | 5/1998 | Johnson | 395/759 |
| 5,752,052 A | 5/1998 | Richardson et al. | 395/759 |
| 5,754,784 A | 5/1998 | Garland et al. | 395/200.49 |
| 5,761,631 A | 6/1998 | Nasukawa | 704/9 |
| 5,774,841 A | 6/1998 | Salazar et al. | 704/225 |
| 5,774,859 A | 6/1998 | Houser et al. | 704/275 |
| 5,794,050 A | 8/1998 | Dahlgren et al. | 395/708 |
| 5,794,196 A | 8/1998 | Yegnanarayanan et al. | 704/255 |
| 5,797,112 A | 8/1998 | Komatsu et al. | 701/201 |
| 5,799,276 A | 8/1998 | Komissarchik et al. | 704/251 |
| 5,802,510 A | 9/1998 | Jones | 707/2 |
| 5,832,221 A | 11/1998 | Jones | 375/200.36 |
| 5,839,107 A | 11/1998 | Gupta et al. | 704/270 |
| 5,848,396 A | 12/1998 | Gerace | 705/10 |
| 5,855,000 A | 12/1998 | Waibel et al. | 704/235 |
| 5,867,817 A | 2/1999 | Catallo et al. | 704/255 |
| 5,878,385 A | 3/1999 | Bralich et al. | 704/9 |
| 5,878,386 A | 3/1999 | Coughlin | 704/10 |
| 5,892,813 A | 4/1999 | Morin et al. | 379/88.01 |
| 5,892,900 A | 4/1999 | Ginter et al. | 395/186 |
| 5,895,464 A | 4/1999 | Bhandari et al. | 707/3 |
| 5,895,466 A | 4/1999 | Goldberg et al. | 707/5 |
| 5,897,613 A | 4/1999 | Chan | 704/210 |
| 5,902,347 A | 5/1999 | Backman et al. | 701/200 |
| 5,911,120 A | 6/1999 | Jarett et al. | 455/417 |
| 5,918,222 A | 6/1999 | Fukui et al. | 707/1 |
| 5,926,784 A | 7/1999 | Richardson et al. | 704/9 |
| 5,933,822 A | 8/1999 | Braden-Harder et al. | 707/5 |
| 5,950,167 A | 9/1999 | Yaker | 704/275 |
| 5,953,393 A | 9/1999 | Culbreth et al. | 379/88.25 |
| 5,960,397 A | 9/1999 | Rahim | 704/244 |
| 5,960,399 A | 9/1999 | Barclay et al. | 704/270 |
| 5,960,447 A | 9/1999 | Holt et al. | 707/500 |
| 5,963,894 A | 10/1999 | Richardson et al. | 704/9 |
| 5,963,940 A | 10/1999 | Liddy et al. | 707/5 |
| 5,987,404 A | 11/1999 | Della Pietra et al. | 704/9 |
| 5,991,721 A | 11/1999 | Asano et al. | 704/257 |
| 5,995,119 A | 11/1999 | Cosatto et al. | 345/473 |
| 5,995,928 A | 11/1999 | Nguyen et al. | 704/251 |
| 6,009,382 A | 12/1999 | Martino et al. | 704/1 |
| 6,014,559 A | 1/2000 | Amin | 455/413 |
| 6,018,708 A | 1/2000 | Dahan et al. | 704/244 |
| 6,021,384 A | 2/2000 | Gorin et al. | 704/1 |
| 6,028,514 A | 2/2000 | Lemelson et al. | 340/539 |
| 6,035,267 A | 3/2000 | Watanabe et al. | 704/1 |
| 6,044,347 A | 3/2000 | Abella et al. | 704/272 |
| 6,049,602 A | 4/2000 | Foladare et al. | 379/265 |
| 6,049,607 A | 4/2000 | Marash et al. | 379/410 |
| 6,058,187 A | 5/2000 | Chen | 380/21 |
| 6,067,513 A | 5/2000 | Ishimitsu | 704/233 |
| 6,076,059 A | 6/2000 | Glickman et al. | 704/260 |
| 6,078,886 A | 6/2000 | Dragosh et al. | 704/270 |
| 6,081,774 A | 6/2000 | De Hita et al. | 704/9 |
| 6,085,186 A | 7/2000 | Christianson et al. | 707/3 |
| 6,101,241 A | 8/2000 | Boyce et al. | 379/88.01 |
| 6,108,631 A | 8/2000 | Ruhl | 704/270 |
| 6,119,087 A | 9/2000 | Kuhn et al. | 704/270 |
| 6,122,613 A | 9/2000 | Baker | 704/235 |
| 6,134,235 A | 10/2000 | Goldman et al. | 370/352 |
| 6,144,667 A | 11/2000 | Doshi et al. | 370/401 |
| 6,144,938 A | 11/2000 | Surace et al. | 704/257 |
| 6,154,526 A | 11/2000 | Dahlke et al. | 379/88.03 |
| 6,160,883 A | 12/2000 | Jackson et al. | 379/230 |
| 6,167,377 A | 12/2000 | Gillick et al. | 704/240 |
| 6,173,266 B1 | 1/2001 | Marx et al. | 704/270 |
| 6,173,279 B1 | 1/2001 | Levin et al. | 707/5 |
| 6,175,858 B1 | 1/2001 | Bulfer et al. | 709/206 |
| 6,185,535 B1 | 2/2001 | Hedin et al. | 704/270 |
| 6,188,982 B1 | 2/2001 | Chiang | 704/256 |
| 6,192,110 B1 | 2/2001 | Abella et al. | 379/88.01 |
| 6,192,338 B1 | 2/2001 | Haszto et al. | 704/257 |
| 6,195,634 B1 | 2/2001 | Dudemaine et al. | 704/231 |
| 6,195,651 B1 | 2/2001 | Handel et al. | 707/2 |
| 6,199,043 B1 | 3/2001 | Happ | 704/272 |
| 6,208,964 B1 | 3/2001 | Sabourin | 704/244 |
| 6,208,972 B1 | 3/2001 | Grant et al. | 704/275 |
| 6,219,346 B1 | 4/2001 | Maxemchuk | 370/338 |
| 6,219,643 B1 | 4/2001 | Cohen et al. | 704/257 |
| 6,226,612 B1 | 5/2001 | Srenger et al. | 704/256 |
| 6,233,556 B1 | 5/2001 | Teunen et al. | 704/250 |
| 6,233,559 B1 | 5/2001 | Balakrishnan | 704/275 |
| 6,233,561 B1 | 5/2001 | Junqua et al. | 704/277 |
| 6,236,968 B1 | 5/2001 | Kanevsky et al. | 704/275 |
| 6,246,981 B1 | 6/2001 | Papineni et al. | 704/235 |
| 6,246,990 B1 | 6/2001 | Happ | 704/275 |
| 6,266,636 B1 | 7/2001 | Kosaka et al. | 704/244 |
| 6,269,336 B1 | 7/2001 | Ladd et al. | 704/270 |
| 6,272,455 B1 | 8/2001 | Hoshen et al. | 704/1 |
| 6,275,231 B1 | 8/2001 | Obradovich | 345/349 |
| 6,278,377 B1 | 8/2001 | DeLine et al. | 340/815.4 |
| 6,278,968 B1 | 8/2001 | Franz et al. | 704/3 |
| 6,288,319 B1 | 9/2001 | Catona | 84/609 |
| 6,292,767 B1 | 9/2001 | Jackson et al. | 704/1 |
| 6,301,560 B1 | 10/2001 | Masters | 704/251 |
| 6,308,151 B1 | 10/2001 | Smith | 704/235 |
| 6,311,159 B1 | 10/2001 | Van Tichelen et al. | 704/275 |
| 6,314,402 B1 | 11/2001 | Monaco et al. | 704/275 |
| 6,321,196 B1 | 11/2001 | Franceschi | 704/243 |
| 6,356,869 B1 | 3/2002 | Chapados et al. | 704/275 |
| 6,362,748 B1 | 3/2002 | Huang | 340/901 |
| 6,366,882 B1 | 4/2002 | Bijl et al. | 704/235 |
| 6,366,886 B1 | 4/2002 | Dragosh et al. | 704/270.1 |
| 6,374,214 B1 | 4/2002 | Friedland et al. | 704/235 |
| 6,377,913 B1 | 4/2002 | Coffman et al. | 704/8 |
| 6,381,535 B1 | 4/2002 | Durocher et al. | 701/202 |
| 6,385,596 B1 | 5/2002 | Wiser et al. | 705/51 |
| 6,385,646 B1 | 5/2002 | Brown et al. | 709/217 |
| 6,393,403 B1 | 5/2002 | Majaniemi | 704/275 |
| 6,393,428 B1 | 5/2002 | Miller et al. | 707/102 |

(56) References Cited

U.S. PATENT DOCUMENTS

| | | | |
|---|---|---|---|
| 6,397,181 B1 | 5/2002 | Li et al. | 704/256 |
| 6,404,878 B1 | 6/2002 | Jackson et al. | 379/221.01 |
| 6,405,170 B1 | 6/2002 | Phillips et al. | 704/270 |
| 6,408,272 B1 | 6/2002 | White et al. | 704/270.1 |
| 6,411,810 B1 | 6/2002 | Maxemchuk | 455/453 |
| 6,411,893 B2 | 6/2002 | Ruhl | 701/207 |
| 6,415,257 B1 | 7/2002 | Junqua et al. | 704/275 |
| 6,418,210 B1 | 7/2002 | Sayko | 379/142.15 |
| 6,420,975 B1 | 7/2002 | DeLine et al. | 340/815.4 |
| 6,429,813 B2 | 8/2002 | Feigen | 342/357.13 |
| 6,430,285 B1 | 8/2002 | Bauer et al. | 379/265.01 |
| 6,430,531 B1 | 8/2002 | Polish | 704/257 |
| 6,434,523 B1 | 8/2002 | Monaco | 704/257 |
| 6,434,524 B1 | 8/2002 | Weber | 704/257 |
| 6,434,529 B1 | 8/2002 | Walker et al. | 704/275 |
| 6,442,522 B1 | 8/2002 | Carberry et al. | 704/257 |
| 6,446,114 B1 | 9/2002 | Bulfer et al. | 709/206 |
| 6,453,153 B1 | 9/2002 | Bowker et al. | 455/67.4 |
| 6,453,292 B2 | 9/2002 | Ramaswamy et al. | 704/235 |
| 6,456,711 B1 | 9/2002 | Cheung et al. | 379/265.09 |
| 6,456,974 B1 | 9/2002 | Baker et al. | 704/270.1 |
| 6,466,654 B1 | 10/2002 | Cooper et al. | 379/88.01 |
| 6,466,899 B1 | 10/2002 | Yano et al. | 704/1 |
| 6,470,315 B1 | 10/2002 | Netsch et al. | 704/256 |
| 6,487,494 B2 | 11/2002 | Odinak et al. | 701/202 |
| 6,487,495 B1 | 11/2002 | Gale et al. | 701/209 |
| 6,498,797 B1 | 12/2002 | Anerousis et al. | 370/522 |
| 6,499,013 B1 | 12/2002 | Weber | 704/257 |
| 6,501,833 B2 | 12/2002 | Phillips et al. | 379/88.07 |
| 6,501,834 B1 | 12/2002 | Milewski et al. | 379/93.24 |
| 6,505,155 B1 | 1/2003 | Vanbuskirk et al. | 704/246 |
| 6,510,417 B1 | 1/2003 | Woods et al. | 704/275 |
| 6,513,006 B2 | 1/2003 | Howard et al. | 704/257 |
| 6,522,746 B1 | 2/2003 | Marchok et al. | 379/406.03 |
| 6,523,061 B1 | 2/2003 | Halverson et al. | 709/202 |
| 6,532,444 B1 | 3/2003 | Weber | 704/257 |
| 6,539,348 B1 | 3/2003 | Bond et al. | 704/9 |
| 6,549,629 B2 | 4/2003 | Finn et al. | 381/92 |
| 6,553,372 B1 | 4/2003 | Brassell et al. | 707/5 |
| 6,556,970 B1 | 4/2003 | Sasaki et al. | 704/257 |
| 6,556,973 B1 | 4/2003 | Lewin | 704/277 |
| 6,560,576 B1 | 5/2003 | Cohen et al. | 704/270 |
| 6,560,590 B1 | 5/2003 | Shwe et al. | 706/55 |
| 6,567,778 B1 | 5/2003 | Chao Chang et al. | 704/257 |
| 6,567,797 B1 | 5/2003 | Schuetze et al. | 707/2 |
| 6,570,555 B1 | 5/2003 | Prevost et al. | 345/156 |
| 6,570,964 B1 | 5/2003 | Murveit et al. | 379/67.1 |
| 6,571,279 B1 | 5/2003 | Herz et al. | 709/217 |
| 6,574,597 B1 | 6/2003 | Mohri et al. | 704/251 |
| 6,574,624 B1 | 6/2003 | Johnson et al. | 707/5 |
| 6,578,022 B1 | 6/2003 | Foulger et al. | 706/45 |
| 6,581,103 B1 | 6/2003 | Dengler | 709/231 |
| 6,584,439 B1 | 6/2003 | Geilhufe et al. | 704/270 |
| 6,587,858 B1 | 7/2003 | Strazza | 707/102 |
| 6,591,239 B1 | 7/2003 | McCall et al. | 704/275 |
| 6,594,257 B1 | 7/2003 | Doshi et al. | 370/352 |
| 6,594,367 B1 | 7/2003 | Marash et al. | 381/92 |
| 6,598,018 B1 | 7/2003 | Junqua | 704/251 |
| 6,601,026 B2 | 7/2003 | Appelt et al. | 704/9 |
| 6,604,075 B1 | 8/2003 | Brown et al. | 704/270.1 |
| 6,604,077 B2 | 8/2003 | Dragosh et al. | 704/270.1 |
| 6,606,598 B1 | 8/2003 | Holthouse et al. | 704/275 |
| 6,611,692 B2 | 8/2003 | Raffel et al. | 455/552 |
| 6,614,773 B1 | 9/2003 | Maxemchuk | 370/337 |
| 6,615,172 B1 | 9/2003 | Bennett et al. | 704/257 |
| 6,622,119 B1 | 9/2003 | Ramaswamy et al. | 704/9 |
| 6,629,066 B1 | 9/2003 | Jackson et al. | 704/9 |
| 6,631,346 B1 | 10/2003 | Karaorman et al. | 704/9 |
| 6,631,351 B1 | 10/2003 | Ramachandran et al. | 704/270 |
| 6,633,846 B1 | 10/2003 | Bennett et al. | 704/257 |
| 6,636,790 B1 | 10/2003 | Lightner et al. | 701/33 |
| 6,643,620 B1 | 11/2003 | Contolini et al. | 704/270 |
| 6,647,363 B2 | 11/2003 | Claassen | 704/1 |
| 6,650,747 B1 | 11/2003 | Bala et al. | 379/265.06 |
| 6,658,388 B1 | 12/2003 | Kleindienst et al. | 704/275 |
| 6,678,680 B1 | 1/2004 | Woo | 707/6 |
| 6,681,206 B1 | 1/2004 | Gorin et al. | 704/243 |
| 6,691,151 B1 | 2/2004 | Cheyer et al. | 709/202 |
| 6,701,294 B1 | 3/2004 | Ball et al. | 704/257 |
| 6,704,396 B2 | 3/2004 | Parolkar et al. | 379/88.17 |
| 6,704,576 B1 | 3/2004 | Brachman et al. | 455/503 |
| 6,704,708 B1 | 3/2004 | Pickering | 704/235 |
| 6,707,421 B1 | 3/2004 | Drury et al. | 342/357.1 |
| 6,708,150 B1 | 3/2004 | Hirayama et al. | 704/243 |
| 6,721,001 B1 | 4/2004 | Berstis | 348/231.3 |
| 6,721,633 B2 | 4/2004 | Funk et al. | 701/1 |
| 6,721,706 B1 | 4/2004 | Strubbe et al. | 704/275 |
| 6,726,636 B2 | 4/2004 | Der Ghazarian et al. | 600/532 |
| 6,735,592 B1 | 5/2004 | Neumann et al. | 707/101 |
| 6,739,556 B1 | 5/2004 | Langston | 244/189 |
| 6,741,931 B1 | 5/2004 | Kohut et al. | 701/209 |
| 6,742,021 B1 | 5/2004 | Halverson et al. | 709/218 |
| 6,745,161 B1 | 6/2004 | Arnold et al. | 704/7 |
| 6,751,591 B1 | 6/2004 | Gorin et al. | 704/257 |
| 6,751,612 B1 | 6/2004 | Schuetze et al. | 707/4 |
| 6,754,485 B1 | 6/2004 | Obradovich et al. | 455/414.1 |
| 6,754,627 B2 | 6/2004 | Woodward | 704/235 |
| 6,757,544 B2 | 6/2004 | Rangarajan et al. | 455/456.1 |
| 6,757,718 B1 | 6/2004 | Halverson et al. | 709/218 |
| 6,795,808 B1 | 9/2004 | Strubbe et al. | 704/275 |
| 6,801,604 B2 | 10/2004 | Maes et al. | 379/88.17 |
| 6,801,893 B1 | 10/2004 | Backfried et al. | 704/257 |
| 6,813,341 B1 | 11/2004 | Mahoney | 379/88.01 |
| 6,829,603 B1 | 12/2004 | Wolf et al. | 707/5 |
| 6,832,230 B1 | 12/2004 | Zilliacus et al. | 707/203 |
| 6,833,848 B1 | 12/2004 | Wolff et al. | 345/719 |
| 6,850,603 B1 | 2/2005 | Eberle et al. | 379/88.16 |
| 6,856,990 B2 | 2/2005 | Barile et al. | 707/10 |
| 6,865,481 B2 | 3/2005 | Kawazoe et al. | 701/211 |
| 6,868,380 B2 | 3/2005 | Kroeker | 704/240 |
| 6,868,385 B1 | 3/2005 | Gerson | 704/275 |
| 6,873,837 B1 | 3/2005 | Yoshioka et al. | 455/321 |
| 6,877,001 B2 | 4/2005 | Wolf et al. | 707/3 |
| 6,877,134 B1 | 4/2005 | Fuller et al. | 715/500.1 |
| 6,901,366 B1 | 5/2005 | Kuhn et al. | 704/275 |
| 6,910,003 B1 | 6/2005 | Arnold et al. | 704/4 |
| 6,912,498 B2 | 6/2005 | Stevens et al. | 704/235 |
| 6,915,126 B2 | 7/2005 | Mazzara, Jr. | 455/411 |
| 6,928,614 B1 | 8/2005 | Everhart | 715/728 |
| 6,934,756 B2 | 8/2005 | Maes | 709/227 |
| 6,937,977 B2 | 8/2005 | Gerson | 704/201 |
| 6,937,982 B2 | 8/2005 | Kitaoka et al. | 704/252 |
| 6,941,266 B1 | 9/2005 | Gorin et al. | 704/257 |
| 6,944,594 B2 | 9/2005 | Busayapongchai et al. | 704/275 |
| 6,950,821 B2 | 9/2005 | Faybishenko et al. | 707/10 |
| 6,954,755 B2 | 10/2005 | Reisman | 707/10 |
| 6,959,276 B2 | 10/2005 | Droppo et al. | 704/226 |
| 6,961,700 B2 | 11/2005 | Mitchell et al. | 704/235 |
| 6,963,759 B1 | 11/2005 | Gerson | 455/563 |
| 6,964,023 B2 | 11/2005 | Maes et al. | 715/811 |
| 6,968,311 B2 | 11/2005 | Knockeart et al. | 704/270 |
| 6,973,387 B2 | 12/2005 | Masclet et al. | 701/211 |
| 6,975,993 B1 | 12/2005 | Keiller | 704/275 |
| 6,980,092 B2 | 12/2005 | Turnbull et al. | 340/425.5 |
| 6,983,055 B2 | 1/2006 | Luo | 381/313 |
| 6,990,513 B2 | 1/2006 | Belfiore et al. | 709/203 |
| 6,996,531 B2 | 2/2006 | Korall et al. | 704/270 |
| 7,003,463 B1 | 2/2006 | Maes et al. | 704/270.1 |
| 7,016,849 B2 | 3/2006 | Arnold et al. | 704/275 |
| 7,020,609 B2 | 3/2006 | Thrift et al. | 704/270.1 |
| 7,024,364 B2 | 4/2006 | Guerra et al. | 704/270 |
| 7,027,586 B2 | 4/2006 | Bushey et al. | 379/265.09 |
| 7,027,975 B1 | 4/2006 | Pazandak et al. | 704/9 |
| 7,035,415 B2 | 4/2006 | Belt et al. | 381/92 |
| 7,036,128 B1 | 4/2006 | Julia et al. | 719/317 |
| 7,043,425 B2 | 5/2006 | Pao | 704/211 |
| 7,054,817 B2 | 5/2006 | Shao | 704/270 |
| 7,058,890 B2 | 6/2006 | George et al. | 715/728 |
| 7,062,488 B1 | 6/2006 | Reisman | 707/8 |
| 7,069,220 B2 | 6/2006 | Coffman et al. | 704/275 |
| 7,072,834 B2 | 7/2006 | Zhou | 704/244 |
| 7,076,362 B2 | 7/2006 | Ohtsuji et al. | 701/211 |
| 7,082,469 B2 | 7/2006 | Gold et al. | 709/231 |
| 7,085,708 B2 | 8/2006 | Manson | 704/9 |

(56) References Cited

U.S. PATENT DOCUMENTS

| | | | |
|---|---|---|---|
| 7,092,928 B1 | 8/2006 | Elad et al. | 706/60 |
| 7,107,210 B2 | 9/2006 | Deng et al. | 704/226 |
| 7,107,218 B1 | 9/2006 | Preston | 704/270 |
| 7,110,951 B1 | 9/2006 | Lemelson et al. | 704/270 |
| 7,127,395 B1 | 10/2006 | Gorin et al. | 704/257 |
| 7,127,400 B2 | 10/2006 | Koch | 704/270.1 |
| 7,130,390 B2 | 10/2006 | Abburi | 379/88.17 |
| 7,136,875 B2 | 11/2006 | Anderson et al. | 707/104.1 |
| 7,137,126 B1 | 11/2006 | Coffman et al. | 719/328 |
| 7,143,037 B1 | 11/2006 | Chestnut | 704/251 |
| 7,143,039 B1 | 11/2006 | Stifelman et al. | 704/270 |
| 7,146,319 B2 | 12/2006 | Hunt | 704/254 |
| 7,149,696 B2 | 12/2006 | Shimizu et al. | 705/1 |
| 7,165,028 B2 | 1/2007 | Gong | 704/233 |
| 7,170,993 B2 | 1/2007 | Anderson et al. | 379/265.09 |
| 7,171,291 B2 | 1/2007 | Obradovich | 701/29 |
| 7,174,300 B2 | 2/2007 | Bush | 704/275 |
| 7,177,798 B2 | 2/2007 | Hsu et al. | 704/9 |
| 7,184,957 B2 | 2/2007 | Brookes et al. | 704/246 |
| 7,190,770 B2 | 3/2007 | Ando et al. | 379/88.01 |
| 7,197,069 B2 | 3/2007 | Agazzi et al. | 375/233 |
| 7,197,460 B1 | 3/2007 | Gupta et al. | 704/270.1 |
| 7,203,644 B2 | 4/2007 | Anderson et al. | 704/246 |
| 7,206,418 B2 | 4/2007 | Yang et al. | 381/92 |
| 7,207,011 B2 | 4/2007 | Mulvey et al. | 715/812 |
| 7,215,941 B2 | 5/2007 | Beckmann et al. | 455/404.1 |
| 7,228,276 B2 | 6/2007 | Omote et al. | 704/243 |
| 7,231,343 B1 | 6/2007 | Treadgold et al. | 704/9 |
| 7,236,923 B1 | 6/2007 | Gupta | 704/9 |
| 7,254,482 B2 | 8/2007 | Kawasaki et al. | 701/211 |
| 7,272,212 B2 | 9/2007 | Eberle et al. | 379/88.17 |
| 7,277,854 B2 | 10/2007 | Bennett et al. | 704/257 |
| 7,283,829 B2 | 10/2007 | Christenson et al. | 455/461 |
| 7,283,951 B2 | 10/2007 | Marchisio et al. | 704/9 |
| 7,289,606 B2 | 10/2007 | Sibal et al. | 379/52 |
| 7,299,186 B2 | 11/2007 | Kuzunuki et al. | 704/270.1 |
| 7,301,093 B2 | 11/2007 | Sater et al. | 84/615 |
| 7,305,381 B1 | 12/2007 | Poppink et al. | 1/1 |
| 7,321,850 B2 | 1/2008 | Wakita | 704/10 |
| 7,328,155 B2 | 2/2008 | Endo et al. | 704/251 |
| 7,337,116 B2 | 2/2008 | Charlesworth et al. | 704/254 |
| 7,340,040 B1 | 3/2008 | Saylor et al. | 379/67.1 |
| 7,366,285 B2 | 4/2008 | Parolkar et al. | 379/88.17 |
| 7,366,669 B2 | 4/2008 | Nishitani et al. | 704/256 |
| 7,376,645 B2 | 5/2008 | Bernard | 707/3 |
| 7,386,443 B1 | 6/2008 | Parthasarathy et al. | 704/201 |
| 7,398,209 B2 | 7/2008 | Kennewick et al. | 704/255 |
| 7,406,421 B2 | 7/2008 | Odinak et al. | 704/275 |
| 7,415,414 B2 | 8/2008 | Azara et al. | 704/270 |
| 7,421,393 B1 | 9/2008 | Di Fabbrizio et al. | 704/275 |
| 7,424,431 B2 | 9/2008 | Greene et al. | 704/270 |
| 7,447,635 B1 | 11/2008 | Konopka et al. | 704/275 |
| 7,451,088 B1 | 11/2008 | Ehlen et al. | 704/270.1 |
| 7,454,608 B2 | 11/2008 | Gopalakrishnan et al. | 713/100 |
| 7,461,059 B2 | 12/2008 | Richardson et al. | 707/5 |
| 7,472,020 B2 | 12/2008 | Brulle-Drews | 701/211 |
| 7,472,060 B1 | 12/2008 | Gorin et al. | 704/240 |
| 7,472,075 B2 | 12/2008 | Odinak et al. | 705/26 |
| 7,477,909 B2 | 1/2009 | Roth | 455/466 |
| 7,478,036 B2 | 1/2009 | Shen et al. | 704/9 |
| 7,487,088 B1 | 2/2009 | Gorin et al. | 704/240 |
| 7,487,110 B2 | 2/2009 | Bennett et al. | 705/26 |
| 7,493,259 B2 | 2/2009 | Jones et al. | 704/257 |
| 7,493,559 B1 | 2/2009 | Wolff et al. | 715/727 |
| 7,502,672 B1 | 3/2009 | Kolls | 701/29 |
| 7,502,738 B2 | 3/2009 | Kennewick et al. | 704/257 |
| 7,516,076 B2 | 4/2009 | Walker et al. | 704/275 |
| 7,529,675 B2 | 5/2009 | Maes | 704/270.1 |
| 7,536,297 B2 | 5/2009 | Byrd et al. | 704/10 |
| 7,536,374 B2 | 5/2009 | Au | 706/55 |
| 7,542,894 B2 | 6/2009 | Murata | 704/9 |
| 7,546,382 B2 | 6/2009 | Healey et al. | 709/246 |
| 7,548,491 B2 | 6/2009 | Macfarlane | 367/198 |
| 7,552,054 B1 | 6/2009 | Stifelman et al. | 704/270 |
| 7,558,730 B2 | 7/2009 | Davis et al. | 704/235 |
| 7,574,362 B2 | 8/2009 | Walker et al. | 704/275 |
| 7,577,244 B2 | 8/2009 | Taschereau | 379/218.01 |
| 7,606,708 B2 | 10/2009 | Hwang | 704/257 |
| 7,620,549 B2 | 11/2009 | Di Cristo et al. | 704/257 |
| 7,634,409 B2 | 12/2009 | Kennewick et al. | 704/257 |
| 7,640,006 B2 | 12/2009 | Portman et al. | 455/412.1 |
| 7,640,160 B2 | 12/2009 | Di Cristo et al. | 704/257 |
| 7,640,272 B2 | 12/2009 | Mahajan et al. | 707/104.1 |
| 7,676,365 B2 | 3/2010 | Hwang et al. | 704/240 |
| 7,676,369 B2 | 3/2010 | Fujimoto et al. | 704/270 |
| 7,684,977 B2 | 3/2010 | Morikawa | 704/211 |
| 7,693,720 B2 | 4/2010 | Kennewick et al. | 704/275 |
| 7,706,616 B2 | 4/2010 | Kristensson et al. | 382/187 |
| 7,729,916 B2 | 6/2010 | Coffman et al. | 704/270 |
| 7,729,918 B2 | 6/2010 | Walker et al. | 704/275 |
| 7,729,920 B2 | 6/2010 | Chaar et al. | 704/275 |
| 7,734,287 B2 | 6/2010 | Ying | 455/423 |
| 7,748,021 B2 | 6/2010 | Obradovich | 725/105 |
| 7,788,084 B2 | 8/2010 | Brun et al. | 704/7 |
| 7,801,731 B2 | 9/2010 | Odinak et al. | 704/275 |
| 7,809,570 B2 | 10/2010 | Kennewick et al. | 704/257 |
| 7,818,176 B2 | 10/2010 | Freeman et al. | 704/270 |
| 7,831,426 B2 | 11/2010 | Bennett | 704/252 |
| 7,831,433 B1 | 11/2010 | Belvin et al. | 704/275 |
| 7,856,358 B2 | 12/2010 | Ho | 704/270 |
| 7,873,519 B2 | 1/2011 | Bennett | 704/257 |
| 7,873,523 B2 | 1/2011 | Potter et al. | 704/275 |
| 7,873,654 B2 | 1/2011 | Bernard | 707/769 |
| 7,881,936 B2 | 2/2011 | Longe et al. | 704/257 |
| 7,890,324 B2 | 2/2011 | Bangalore et al. | 704/231 |
| 7,894,849 B2 | 2/2011 | Kass et al. | 455/550.1 |
| 7,902,969 B2 | 3/2011 | Obradovich | 340/439 |
| 7,917,367 B2 | 3/2011 | Di Cristo et al. | 704/270.1 |
| 7,920,682 B2 | 4/2011 | Byrne et al. | 379/88.18 |
| 7,949,529 B2 | 5/2011 | Weider et al. | 704/270 |
| 7,949,537 B2 | 5/2011 | Walker et al. | 704/275 |
| 7,953,732 B2 | 5/2011 | Frank et al. | 707/724 |
| 7,974,875 B1 | 7/2011 | Quilici et al. | 705/14.4 |
| 7,983,917 B2 | 7/2011 | Kennewick et al. | 704/257 |
| 7,984,287 B2 | 7/2011 | Gopalakrishnan et al. | 713/100 |
| 8,005,683 B2 | 8/2011 | Tessel et al. | 704/275 |
| 8,015,006 B2 | 9/2011 | Kennewick et al. | 704/236 |
| 8,060,367 B2 | 11/2011 | Keaveney | 704/247 |
| 8,069,046 B2 | 11/2011 | Kennewick et al. | 704/257 |
| 8,073,681 B2 | 12/2011 | Baldwin et al. | 704/9 |
| 8,077,975 B2 | 12/2011 | Ma et al. | 382/187 |
| 8,082,153 B2 | 12/2011 | Coffman et al. | 704/270 |
| 8,086,463 B2 | 12/2011 | Ativanichayaphong et al. | 704/275 |
| 8,112,275 B2 | 2/2012 | Kennewick et al. | 704/240 |
| 8,140,327 B2 | 3/2012 | Kennewick et al. | 704/226 |
| 8,140,335 B2 | 3/2012 | Kennewick et al. | 704/257 |
| 8,145,489 B2 | 3/2012 | Freeman et al. | 704/257 |
| 8,150,694 B2 | 4/2012 | Kennewick et al. | 704/257 |
| 8,155,962 B2 | 4/2012 | Kennewick et al. | 704/257 |
| 8,170,867 B2 | 5/2012 | Germain | 704/9 |
| 8,195,468 B2 | 6/2012 | Weider et al. | 704/275 |
| 8,200,485 B1 | 6/2012 | Lee | 704/231 |
| 8,219,399 B2 | 7/2012 | Lutz et al. | 704/270 |
| 8,219,599 B2 | 7/2012 | Tunstall-Pedoe | 707/955 |
| 8,224,652 B2 | 7/2012 | Wang et al. | 704/275 |
| 8,255,224 B2 | 8/2012 | Singleton et al. | 704/275 |
| 8,326,627 B2 | 12/2012 | Kennewick et al. | 704/257 |
| 8,326,634 B2 | 12/2012 | Di Cristo et al. | 704/270.1 |
| 8,326,637 B2 | 12/2012 | Baldwin et al. | 704/275 |
| 8,332,224 B2 | 12/2012 | Di Cristo et al. | 704/257 |
| 8,370,147 B2 | 2/2013 | Kennewick et al. | 704/275 |
| 8,447,607 B2 | 5/2013 | Weider et al. | 704/250 |
| 8,452,598 B2 | 5/2013 | Kennewick et al. | 704/257 |
| 8,509,403 B2 | 8/2013 | Chiu et al. | 379/114.13 |
| 8,515,765 B2 | 8/2013 | Baldwin et al. | 704/275 |
| 8,527,274 B2 | 9/2013 | Freeman et al. | 704/257 |
| 8,589,161 B2 | 11/2013 | Kennewick et al. | 704/252 |
| 8,620,659 B2 | 12/2013 | Di Cristo et al. | 704/257 |
| 8,719,009 B2 | 5/2014 | Baldwin et al. | 704/9 |
| 8,719,026 B2 | 5/2014 | Kennewick et al. | 704/257 |
| 8,731,929 B2 | 5/2014 | Kennewick et al. | 704/257 |
| 8,738,380 B2 | 5/2014 | Baldwin et al. | 704/257 |
| 8,849,652 B2 | 9/2014 | Weider et al. | 704/9 |

(56) References Cited

U.S. PATENT DOCUMENTS

| | | | |
|---|---|---|---|
| 8,849,670 B2 | 9/2014 | Di Cristo et al. | 704/270.1 |
| 8,886,536 B2 | 11/2014 | Freeman et al. | 704/257 |
| 8,983,839 B2 | 3/2015 | Kennewick et al. | 704/254 |
| 9,015,049 B2 | 4/2015 | Baldwin et al. | |
| 2001/0039492 A1 | 11/2001 | Nemoto | 704/231 |
| 2001/0041980 A1 | 11/2001 | Howard et al. | 704/270 |
| 2001/0049601 A1 | 12/2001 | Kroeker et al. | 704/254 |
| 2001/0054087 A1 | 12/2001 | Flom et al. | 709/218 |
| 2002/0015500 A1 | 2/2002 | Belt et al. | 381/66 |
| 2002/0022927 A1 | 2/2002 | Lemelson et al. | 701/301 |
| 2002/0029261 A1 | 3/2002 | Shibata | 709/219 |
| 2002/0032752 A1 | 3/2002 | Gold et al. | 709/218 |
| 2002/0035501 A1 | 3/2002 | Handel et al. | 705/10 |
| 2002/0040297 A1 | 4/2002 | Tsiao et al. | 704/257 |
| 2002/0049535 A1 | 4/2002 | Rigo et al. | 701/211 |
| 2002/0049805 A1 | 4/2002 | Yamada et al. | 709/202 |
| 2002/0059068 A1 | 5/2002 | Rose et al. | 704/246 |
| 2002/0065568 A1 | 5/2002 | Silfvast et al. | 700/94 |
| 2002/0067839 A1 | 6/2002 | Heinrich | 381/110 |
| 2002/0069059 A1 | 6/2002 | Smith | 704/257 |
| 2002/0069071 A1 | 6/2002 | Knockeart et al. | 704/275 |
| 2002/0082911 A1 | 6/2002 | Dunn et al. | 705/14 |
| 2002/0087312 A1 | 7/2002 | Lee et al. | 704/251 |
| 2002/0087326 A1 | 7/2002 | Lee et al. | 704/270.1 |
| 2002/0087525 A1 | 7/2002 | Abbott et al. | 707/3 |
| 2002/0107694 A1 | 8/2002 | Lerg | 704/273 |
| 2002/0120609 A1 | 8/2002 | Lang et al. | 707/1 |
| 2002/0124050 A1 | 9/2002 | Middeljans | 709/203 |
| 2002/0133354 A1 | 9/2002 | Ross et al. | 704/275 |
| 2002/0133402 A1 | 9/2002 | Faber et al. | 705/14 |
| 2002/0135618 A1 | 9/2002 | Maes et al. | 345/767 |
| 2002/0138248 A1 | 9/2002 | Corston-Oliver et al. | 704/1 |
| 2002/0143532 A1 | 10/2002 | McLean et al. | 704/235 |
| 2002/0143535 A1 | 10/2002 | Kist et al. | 704/251 |
| 2002/0161646 A1 | 10/2002 | Gailey et al. | 705/14 |
| 2002/0173333 A1 | 11/2002 | Buchholz et al. | 455/527 |
| 2002/0173961 A1 | 11/2002 | Guerra | 704/258 |
| 2002/0184373 A1 | 12/2002 | Maes | 709/228 |
| 2002/0188602 A1 | 12/2002 | Stubler et al. | 707/3 |
| 2002/0198714 A1 | 12/2002 | Zhou | 704/252 |
| 2003/0014261 A1 | 1/2003 | Kageyama | 704/275 |
| 2003/0016835 A1 | 1/2003 | Elko et al. | 381/92 |
| 2003/0046346 A1 | 3/2003 | Mumick et al. | 709/205 |
| 2003/0064709 A1 | 4/2003 | Gailey et al. | 455/412 |
| 2003/0065427 A1 | 4/2003 | Funk et al. | 701/1 |
| 2003/0069734 A1 | 4/2003 | Everhart | 704/275 |
| 2003/0088421 A1 | 5/2003 | Maes et al. | 704/270.1 |
| 2003/0097249 A1 | 5/2003 | Walker et al. | 704/1 |
| 2003/0110037 A1 | 6/2003 | Walker et al. | 704/257 |
| 2003/0112267 A1 | 6/2003 | Belrose | 345/728 |
| 2003/0115062 A1 | 6/2003 | Walker et al. | 704/258 |
| 2003/0120493 A1 | 6/2003 | Gupta | 704/270.1 |
| 2003/0135488 A1 | 7/2003 | Amir et al. | 707/3 |
| 2003/0144846 A1 | 7/2003 | Denenberg et al. | 704/277 |
| 2003/0158731 A1 | 8/2003 | Falcon et al. | 704/231 |
| 2003/0161448 A1 | 8/2003 | Parolkar et al. | 379/88.17 |
| 2003/0182132 A1 | 9/2003 | Niemoeller | 704/275 |
| 2003/0204492 A1 | 10/2003 | Wolf et al. | 707/3 |
| 2003/0206640 A1 | 11/2003 | Malvar et al. | 381/93 |
| 2003/0212550 A1 | 11/2003 | Ubale | 704/215 |
| 2003/0212558 A1 | 11/2003 | Matula | 704/260 |
| 2003/0212562 A1 | 11/2003 | Patel et al. | 704/275 |
| 2003/0225825 A1 | 12/2003 | Healey et al. | 709/203 |
| 2003/0236664 A1 | 12/2003 | Sharma | 704/251 |
| 2004/0006475 A1 | 1/2004 | Ehlen et al. | 704/270.1 |
| 2004/0010358 A1 | 1/2004 | Oesterling et al. | 701/49 |
| 2004/0025115 A1 | 2/2004 | Sienel et al. | 715/513 |
| 2004/0044516 A1 | 3/2004 | Kennewick et al. | 704/5 |
| 2004/0098245 A1 | 5/2004 | Walker et al. | 704/1 |
| 2004/0117179 A1 | 6/2004 | Balasuriya | 704/231 |
| 2004/0117804 A1 | 6/2004 | Scahill et al. | 719/320 |
| 2004/0122674 A1 | 6/2004 | Bangalore et al. | 704/276 |
| 2004/0140989 A1 | 7/2004 | Papageorge | 345/700 |
| 2004/0158555 A1 | 8/2004 | Seedman et al. | 707/3 |
| 2004/0166832 A1 | 8/2004 | Portman et al. | 455/412.1 |
| 2004/0167771 A1 | 8/2004 | Duan et al. | 704/10 |
| 2004/0172258 A1 | 9/2004 | Dominach et al. | 704/277 |
| 2004/0193408 A1 | 9/2004 | Hunt | 704/209 |
| 2004/0193420 A1 | 9/2004 | Kennewick et al. | 704/257 |
| 2004/0199375 A1 | 10/2004 | Ehsani et al. | 704/4 |
| 2004/0205671 A1 | 10/2004 | Sukehiro et al. | 715/532 |
| 2004/0243417 A9 | 12/2004 | Pitts, III et al. | 704/276 |
| 2005/0015256 A1 | 1/2005 | Kargman | 704/272 |
| 2005/0021331 A1 | 1/2005 | Huang et al. | 704/231 |
| 2005/0021334 A1 | 1/2005 | Iwahashi | 704/240 |
| 2005/0021470 A1 | 1/2005 | Martin et al. | 705/51 |
| 2005/0021826 A1 | 1/2005 | Kumar | 709/232 |
| 2005/0033574 A1 | 2/2005 | Kim et al. | 704/251 |
| 2005/0033582 A1 | 2/2005 | Gadd et al. | 704/277 |
| 2005/0043940 A1 | 2/2005 | Elder | 704/9 |
| 2005/0080632 A1* | 4/2005 | Endo et al. | 704/277 |
| 2005/0114116 A1 | 5/2005 | Fiedler | 704/201 |
| 2005/0125232 A1 | 6/2005 | Gadd | 704/270.1 |
| 2005/0131673 A1 | 6/2005 | Koizumi et al. | 704/2 |
| 2005/0137850 A1 | 6/2005 | Odell | 704/4 |
| 2005/0137877 A1 | 6/2005 | Oesterling et al. | 704/275 |
| 2005/0143994 A1 | 6/2005 | Mori et al. | 704/235 |
| 2005/0144013 A1 | 6/2005 | Fujimoto et al. | 704/277 |
| 2005/0216254 A1 | 9/2005 | Gupta et al. | 704/9 |
| 2005/0234727 A1 | 10/2005 | Chiu | 704/270.1 |
| 2005/0246174 A1 | 11/2005 | DeGolia | 704/270 |
| 2005/0283752 A1 | 12/2005 | Fruchter et al. | 717/100 |
| 2006/0041431 A1 | 2/2006 | Maes | 704/270.1 |
| 2006/0047509 A1 | 3/2006 | Ding et al. | 704/231 |
| 2006/0072738 A1 | 4/2006 | Louis et al. | 379/265.02 |
| 2006/0074671 A1 | 4/2006 | Farmaner et al. | 704/257 |
| 2006/0206310 A1 | 9/2006 | Ravikumar et al. | 704/9 |
| 2006/0217133 A1 | 9/2006 | Christenson et al. | 455/461 |
| 2006/0285662 A1 | 12/2006 | Yin et al. | 379/88.16 |
| 2007/0033005 A1 | 2/2007 | Cristo et al. | 704/9 |
| 2007/0033020 A1 | 2/2007 | Francois et al. | 704/226 |
| 2007/0038436 A1 | 2/2007 | Cristo et al. | 704/9 |
| 2007/0038445 A1 | 2/2007 | Helbing et al. | 704/235 |
| 2007/0043569 A1 | 2/2007 | Potter, III et al. | 704/270 |
| 2007/0043574 A1 | 2/2007 | Coffman et al. | 704/275 |
| 2007/0043868 A1 | 2/2007 | Kumar et al. | 709/226 |
| 2007/0050191 A1 | 3/2007 | Weider et al. | 704/275 |
| 2007/0055525 A1 | 3/2007 | Kennewick et al. | 704/257 |
| 2007/0061067 A1 | 3/2007 | Zeinstra et al. | 701/200 |
| 2007/0061735 A1 | 3/2007 | Hoffberg et al. | 715/744 |
| 2007/0073544 A1 | 3/2007 | Millett et al. | 704/277 |
| 2007/0078708 A1 | 4/2007 | Yu et al. | 705/14 |
| 2007/0078709 A1 | 4/2007 | Rajaram | 705/14 |
| 2007/0094003 A1 | 4/2007 | Huang et al. | 704/3 |
| 2007/0118357 A1 | 5/2007 | Kasravi et al. | 704/10 |
| 2007/0135101 A1 | 6/2007 | Ramati et al. | 455/414.1 |
| 2007/0146833 A1 | 6/2007 | Satomi et al. | 358/537 |
| 2007/0162296 A1 | 7/2007 | Altberg et al. | 705/1 |
| 2007/0179778 A1 | 8/2007 | Gong et al. | 704/9 |
| 2007/0186165 A1 | 8/2007 | Maislos et al. | 715/728 |
| 2007/0198267 A1 | 8/2007 | Jones et al. | 704/257 |
| 2007/0203736 A1 | 8/2007 | Ashton | 705/1 |
| 2007/0214182 A1 | 9/2007 | Rosenberg | 707/104.1 |
| 2007/0250901 A1 | 10/2007 | McIntire et al. | 725/146 |
| 2007/0265850 A1 | 11/2007 | Kennewick et al. | 704/257 |
| 2007/0266257 A1 | 11/2007 | Camaisa et al. | 713/182 |
| 2007/0276651 A1 | 11/2007 | Bliss et al. | 704/9 |
| 2007/0299824 A1 | 12/2007 | Pan et al. | 707/3 |
| 2008/0034032 A1 | 2/2008 | Healey et al. | 709/203 |
| 2008/0065386 A1* | 3/2008 | Cross et al. | 704/270 |
| 2008/0091406 A1 | 4/2008 | Baldwin et al. | 704/4 |
| 2008/0103761 A1 | 5/2008 | Printz et al. | 704/9 |
| 2008/0109285 A1 | 5/2008 | Reuther et al. | 705/7 |
| 2008/0115163 A1 | 5/2008 | Gilboa et al. | 725/34 |
| 2008/0133215 A1 | 6/2008 | Sarukkai | 704/2 |
| 2008/0140385 A1 | 6/2008 | Mahajan et al. | 704/9 |
| 2008/0147396 A1 | 6/2008 | Wang | 704/246 |
| 2008/0147410 A1 | 6/2008 | Odinak | 704/270.1 |
| 2008/0154604 A1 | 6/2008 | Sathish et al. | 704/257 |
| 2008/0162471 A1* | 7/2008 | Bernard | 707/5 |
| 2008/0177530 A1 | 7/2008 | Cross et al. | 704/4 |
| 2008/0189110 A1 | 8/2008 | Freeman et al. | 704/251 |
| 2008/0235023 A1 | 9/2008 | Kennewick et al. | 704/257 |
| 2008/0235027 A1 | 9/2008 | Cross | 704/270.1 |

(56) References Cited

U.S. PATENT DOCUMENTS

| | | | |
|---|---|---|---|
| 2008/0319751 A1 | 12/2008 | Kennewick et al. | 704/257 |
| 2009/0052635 A1 | 2/2009 | Jones et al. | 379/88.02 |
| 2009/0067599 A1 | 3/2009 | Agarwal et al. | 379/114.21 |
| 2009/0076827 A1 | 3/2009 | Bulitta et al. | 704/275 |
| 2009/0106029 A1 | 4/2009 | DeLine et al. | 704/275 |
| 2009/0117885 A1 | 5/2009 | Roth | 455/414.3 |
| 2009/0144271 A1 | 6/2009 | Richardson et al. | 707/5 |
| 2009/0150156 A1 | 6/2009 | Kennewick et al. | 704/257 |
| 2009/0171664 A1 | 7/2009 | Kennewick et al. | 704/257 |
| 2009/0216540 A1 | 8/2009 | Tessel et al. | 704/275 |
| 2009/0259646 A1 | 10/2009 | Fujita et al. | 707/5 |
| 2009/0271194 A1 | 10/2009 | Davis et al. | 704/235 |
| 2009/0273563 A1 | 11/2009 | Pryor | 345/157 |
| 2009/0276700 A1 | 11/2009 | Anderson et al. | 715/700 |
| 2009/0299745 A1 | 12/2009 | Kennewick et al. | 704/257 |
| 2009/0307031 A1 | 12/2009 | Winkler et al. | 705/7 |
| 2009/0313026 A1 | 12/2009 | Coffman et al. | 704/275 |
| 2010/0023320 A1 | 1/2010 | Di Cristo et al. | 704/9 |
| 2010/0029261 A1 | 2/2010 | Mikkelsen et al. | 455/419 |
| 2010/0036967 A1 | 2/2010 | Caine et al. | 709/236 |
| 2010/0049501 A1 | 2/2010 | Kennewick et al. | 704/9 |
| 2010/0049514 A1 | 2/2010 | Kennewick et al. | 704/233 |
| 2010/0057443 A1 | 3/2010 | Di Cristo et al. | 704/9 |
| 2010/0063880 A1 | 3/2010 | Atsmon et al. | 705/14.53 |
| 2010/0064025 A1 | 3/2010 | Nelimarkka et al. | 709/217 |
| 2010/0094707 A1* | 4/2010 | Freer | 705/14.54 |
| 2010/0145700 A1 | 6/2010 | Kennewick et al. | 704/257 |
| 2010/0185512 A1 | 7/2010 | Borger et al. | 705/14.49 |
| 2010/0204986 A1 | 8/2010 | Kennewick et al. | 704/226 |
| 2010/0204994 A1 | 8/2010 | Kennewick et al. | 704/257 |
| 2010/0217604 A1 | 8/2010 | Baldwin et al. | 704/275 |
| 2010/0286985 A1 | 11/2010 | Kennewick et al. | 704/257 |
| 2010/0299142 A1 | 11/2010 | Freeman et al. | 704/9 |
| 2010/0312566 A1 | 12/2010 | Odinak et al. | 704/275 |
| 2011/0022393 A1* | 1/2011 | Waller et al. | 704/270 |
| 2011/0112827 A1 | 5/2011 | Kennewick et al. | 704/9 |
| 2011/0112921 A1 | 5/2011 | Kennewick et al. | 705/26.1 |
| 2011/0131036 A1 | 6/2011 | Di Cristo et al. | 704/9 |
| 2011/0131045 A1 | 6/2011 | Cristo et al. | 704/249 |
| 2011/0231182 A1 | 9/2011 | Weider et al. | 704/9 |
| 2011/0231188 A1 | 9/2011 | Kennewick et al. | 704/236 |
| 2012/0022857 A1 | 1/2012 | Baldwin et al. | 704/9 |
| 2012/0101809 A1 | 4/2012 | Kennewick et al. | 704/9 |
| 2012/0101810 A1 | 4/2012 | Kennewick et al. | 704/9 |
| 2012/0109753 A1 | 5/2012 | Kennewick et al. | 705/14.58 |
| 2012/0150636 A1 | 6/2012 | Freeman et al. | 705/14.49 |
| 2012/0278073 A1 | 11/2012 | Weider et al. | 704/235 |
| 2013/0054228 A1 | 2/2013 | Baldwin et al. | 704/9 |
| 2013/0080177 A1 | 3/2013 | Chen | 704/275 |
| 2013/0211710 A1 | 8/2013 | Kennewick et al. | 701/411 |
| 2013/0253929 A1 | 9/2013 | Weider et al. | 704/235 |
| 2013/0297293 A1 | 11/2013 | Di Cristo et al. | 704/9 |
| 2013/0304473 A1 | 11/2013 | Baldwin et al. | 704/257 |
| 2013/0339022 A1 | 12/2013 | Baldwin et al. | 704/257 |
| 2014/0012577 A1 | 1/2014 | Freeman et al. | 704/249 |
| 2014/0108013 A1 | 4/2014 | Di Cristo et al. | 704/254 |
| 2014/0156278 A1 | 6/2014 | Kennewick et al. | 704/254 |
| 2014/0249821 A1 | 9/2014 | Kennewick et al. | 704/257 |
| 2014/0288934 A1 | 9/2014 | Kennewick et al. | 704/257 |
| 2014/0365222 A1 | 12/2014 | Weider et al. | 704/257 |
| 2015/0019217 A1 | 1/2015 | Di Cristo et al. | 704/235 |
| 2015/0066627 A1 | 3/2015 | Freeman et al. | 705/14.41 |
| 2015/0073910 A1 | 3/2015 | Kennewick et al. | 705/14.58 |
| 2015/0095159 A1 | 4/2015 | Kennewick et al. | 705/14.58 |
| 2015/0142447 A1 | 5/2015 | Kennewick et al. | |

FOREIGN PATENT DOCUMENTS

| | | |
|---|---|---|
| JP | 2006-146881 | 6/2006 |
| JP | 2008-027454 | 2/2008 |
| JP | 2008-139928 | 6/2008 |
| WO | WO 99/46763 | 9/1999 |
| WO | WO 00/21232 | 4/2000 |
| WO | WO 00/46792 | 8/2000 |
| WO | WO 01/78065 | 10/2001 |
| WO | WO 2004/072954 | 8/2004 |
| WO | WO 2007/019318 | 2/2007 |
| WO | WO 2007/021587 | 2/2007 |
| WO | WO 2007/027546 | 3/2007 |
| WO | WO 2007/027989 | 3/2007 |
| WO | WO 2008/098039 | 8/2008 |
| WO | WO 2008/118195 | 10/2008 |
| WO | WO 2009/075912 | 6/2009 |
| WO | WO 2009/145796 | 12/2009 |
| WO | WO 2010/096752 | 8/2010 |

OTHER PUBLICATIONS

Lin, Bor-shen, et al., "A Distributed Architecture for Cooperative Spoken Dialogue Agents with Coherent Dialogue State and History", ASRU'99, 1999, 4 pages.

Kuhn, Thomas, et al., "Hybrid In-Car Speech Recognition for Mobile Multimedia Applications", Vehicular Technology Conference, IEEE, Jul. 1999, pp. 2009-2013.

Belvin, Robert, et al., "Development of the HRL Route Navigation Dialogue System", Proceedings of the First International Conference on Human Language Technology Research, San Diego, 2001, pp. 1-5.

Lind, R., et al., "The Network Vehicle—A Glimpse into the Future of Mobile Multi-Media", *IEEE Aerosp. Electron. Systems Magazine*, vol. 14, No. 9, Sep. 1999, pp. 27-32.

Zhao, Yilin, "Telematics: Safe and Fun Driving", *IEEE Intelligent Systems*, vol. 17, Issue 1, 2002, pp. 10-14.

Chai et al., "MIND: A Semantics-Based Multimodal Interpretation Framework for Conversational System", *Proceedings of the International CLASS Workshop on Natural, Intelligent and Effective Interaction in Multimodal Dialogue Systems*, Jun. 2002, pp. 37-46.

Cheyer et al., "Multimodal Maps: An Agent-Based Approach", *International Conference on Cooperative Multimodal Communication* (CMC/95), May 24-26, 1995, pp. 111-121.

Elio et al., "On Abstract Task Models and Conversation Policies" in Workshop on Specifying and Implementing Conversation Policies, *Autonomous Agents '99*, Seattle, 1999, 10 pages.

Turunen, "Adaptive Interaction Methods in Speech User Interfaces", Conference on Human Factors in Computing Systems, Seattle, Washington, 2001, pp. 91-92.

Mao, Mark Z., "Automatic Training Set Segmentation for Multi-Pass Speech Recognition", Department of Electrical Engineering, Stanford University, CA, copyright 2005, IEEE, pp. I-685 to I-688.

Vanhoucke, Vincent, "Confidence Scoring and Rejection Using Multi-Pass Speech Recognition", Nuance Communications, Menlo Park, CA, 2005, 4 pages.

Weng, Fuliang, et al., "Efficient Lattice Representation and Generation", Speech Technology and Research Laboratory, SRI International, Menlo Park, CA, 1998, 4 pages.

El Meliani et al., "A Syllabic-Filler-Based Continuous Speech Recognizer for Unlimited Vocabulary", Canadian Conference on Electrical and Computer Engineering, vol. 2, Sep. 5-8, 1995, pp. 1007-1010.

Arrington, Michael, "Google Redefines GPS Navigation Landscape: Google Maps Navigation for Android 2.0", TechCrunch, printed from the Internet <http://www.techcrunch.com/2009/10/28/google-redefines-car-gps-navigation-google-maps-navigation-android/>, Oct. 28, 2009, 4 pages.

Bazzi, Issam et al., "Heterogeneous Lexical Units for Automatic Speech Recognition: Preliminary Investigations", *Processing of the IEEE International Conference on Acoustics, Speech, and Signal Processing*, vol. 3, Jun. 5-9, 2000, XP010507574, pp. 1257-1260.

O'Shaughnessy, Douglas, "Interacting with Computers by Voice: Automatic Speech Recognition and Synthesis", *Proceedings of the IEEE*, vol. 91, No. 9, Sep. 1, 2003, XP011100665, pp. 1272-1305.

Statement in Accordance with the Notice from the European Patent Office dated Oct. 1, 2007 Concerning Business Methods (OJ EPO Nov. 2007, 592-593), XP002456252.

* cited by examiner

SYSTEM AND METHOD FOR PROCESSING MULTI-MODAL DEVICE INTERACTIONS IN A NATURAL LANGUAGE VOICE SERVICES ENVIRONMENT

CROSS-REFERENCE TO RELATED APPLICATIONS

This application is a continuation of U.S. patent application Ser. No. 13/692,451, entitled "System and Method for Processing Multi-Modal Device Interactions in a Natural Language Voice Services Environment," filed on Dec. 3, 2012, which is a continuation of U.S. patent application Ser. No. 12/389,678, entitled "System and Method for Processing Multi-Modal Device Interactions in a Natural Language Voice Services Environment," filed on Feb. 20, 2009, which issued as U.S. Pat. No. 8,326,637 on Dec. 4, 2012, the contents of which are hereby incorporated by reference in its entirety.

FIELD OF THE INVENTION

The invention relates to an integrated natural language voice services environment for processing multi-modal interactions with or one or more devices and/or applications, wherein the multi-modal interactions may provide additional context for cooperatively interpreting and otherwise processing a natural language utterance accompanying the multi-modal interactions.

BACKGROUND OF THE INVENTION

As technology has progressed in recent years, consumer electronic devices have emerged to become nearly ubiquitous in the everyday lives of many people. To meet the increasing demand that has resulted from growth in the functionality and mobility of mobile phones, navigation devices, embedded devices, and other such devices, many devices offer a wealth of features and functions in addition to core applications. Greater functionality also introduces trade-offs, however, including learning curves that often inhibit users from fully exploiting all of the capabilities of their electronic devices. For example, many existing electronic devices include complex human to machine interfaces that may not be particularly user-friendly, which can inhibit mass-market adoption for many technologies. Moreover, cumbersome interfaces often result in otherwise desirable features being difficult to find or use (e.g., because of menus that are complex or otherwise tedious to navigate). As such, many users tend not to use, or even know about, many of the potential capabilities of their devices.

As such, the increased functionality of electronic devices often tends to be wasted, as market research suggests that many users only use only a fraction of the features or applications available on a given device. Moreover, in a society where wireless networking and broadband access are increasingly prevalent, consumers tend to naturally desire seamless mobile capabilities from their electronic devices. Thus, as consumer demand intensifies for simpler mechanisms to interact with electronic devices, cumbersome interfaces that prevent quick and focused interaction become an important concern. Nevertheless, the ever-growing demand for mechanisms to use technology in intuitive ways remains largely unfulfilled.

One approach towards simplifying human to machine interactions in electronic devices has included the use of voice recognition software, which has the potential to enable users to exploit features that would otherwise be unfamiliar, unknown, or difficult to use. For example, a recent survey conducted by the Navteq Corporation, which provides data used in a variety of applications such as automotive navigation and web-based applications, demonstrates that voice recognition often ranks among the features most desired by consumers of electronic devices. Even so, existing voice user interfaces, when they actually work, still require significant learning on the part of the user.

For example, many existing voice user interface only support requests formulated according to specific command-and-control sequences or syntaxes. Furthermore, many existing voice user interfaces cause user frustration or dissatisfaction because of inaccurate speech recognition. Similarly, by forcing a user to provide pre-established commands or keywords to communicate requests in ways that a system can understand, existing voice user interfaces do not effectively engage the user in a productive, cooperative dialogue to resolve requests and advance a conversation towards a satisfactory goal (e.g., when users may be uncertain of particular needs, available information, device capabilities, etc.). As such, existing voice user interfaces tend to suffer from various drawbacks, including significant limitations on engaging users in a dialogue in a cooperative and conversational manner.

Additionally, many existing voice user interfaces fall short in utilizing information distributed across different domains, devices, and applications in order to resolve natural language voice-based inputs. Thus, existing voice user interfaces suffer from being constrained to a finite set of applications for which they have been designed, or to devices on which they reside. Although technological advancement has resulted in users often having several devices to suit their various needs, existing voice user interfaces do not adequately free users from device constraints. For example, users may be interested in services associated with different applications and devices, but existing voice user interfaces tend to restrict users from accessing the applications and devices as they see fit. Moreover, users typically can only practicably carry a finite number of devices at any given time, yet content or services associated with users' other devices currently being used may be desired in various circumstances.

Accordingly, although users tend to have varying needs, where content or services associated with different devices may be desired in various contexts or environments, existing voice technologies tend to fall short in providing an integrated environment in which users can request content or services associated with virtually any device or network. As such, constraints on information availability and device interaction mechanisms in existing voice services environments tend to prevent users from experiencing technology in an intuitive, natural, and efficient way. For instance, when a user wishes to perform a given function using a given electronic device but does not necessarily know how to go about performing the function, the user typically cannot engage in a multi-modal interaction with the device to simply utter words in natural language to request the function.

Furthermore, relatively simple functions can often be tedious to perform using electronic devices that do not have voice recognition capabilities. For example, purchasing new ring-tones for a mobile phone tends to be a relatively straightforward process, but users must typically navigate several menus and press many different buttons in order to complete the process. As such, it becomes apparent that interaction with electronic devices could be far more efficient if users were able to use natural language to exploit buried or otherwise difficult to use functionality. Existing systems suffer from these and other problems.

SUMMARY OF THE INVENTION

According to one aspect of the invention, a system and method for processing multi-modal device interactions in a natural language voice services environment may be provided. In particular, one or more multi-modal interactions may be received in a natural language voice services environment that includes one or more electronic devices. The multi-modal device interactions may include a user engaging in a non-voice interaction with one or more of the electronic devices or applications associated with the devices, while also providing a natural language utterance in relation to the non-voice interaction. For example, the non-voice device interaction may comprise the user selecting a particular segment, item, data, point of focus, or attention focus, or otherwise engaging in one or more unique and distinguishable interactions with the electronic devices or applications associated therewith. As such, context may be extracted from the natural language utterance, and the non-voice device interaction may provide additional context for the natural language utterance. The context of the utterance and the non-voice device interaction may then be combined to determine an intent of the multi-modal device interaction, wherein one or more of the electronic devices may process a request based on the intent of the multi-modal device interaction.

According to one aspect of the invention, at least one of the electronic devices may include an input device configured to receive voice-based inputs. In one implementation, the voice-based input device may be signaled to capture the natural language utterance in response to detecting the non-voice interaction with the one or more electronic devices or applications. Furthermore, the natural language voice services environment may include one or more listeners established for the electronic devices and the associated applications, wherein the listeners may be configured to detect the non-voice interaction with the electronic devices or applications. As such, information relating to the non-voice interaction and the accompanying natural language utterance may be aligned to enable cooperative processing of the utterance and the non-voice device interaction.

According to one aspect of the invention, at least one transaction lead may be generated based on the intent of the multi-modal device interaction. For example, a further multi-modal device interaction may be received, wherein the further multi-modal device interaction may relate to the transaction lead generated for the first multi-modal device interaction. At least one request may then be routed to one or more of the electronic devices based on an intent determined for the further multi-modal device interaction, whereby a transaction click-through may be processed in response to receiving the device interaction relating to the generated transaction lead. For example, the transaction lead may include an advertisement or a recommendation that is selected based on the intent of the original multi-modal device interaction, while the further multi-modal device interaction may include a user selecting the advertisement or recommendation. Thus, the selection of the advertisement or recommendation may be considered a transaction click-through, which may generate revenue for a particular entity (e.g., a provider of the natural language voice services environment).

Other objects and advantages of the invention will be apparent based on the following drawings and detailed description.

DETAILED DESCRIPTION

Figure 1:
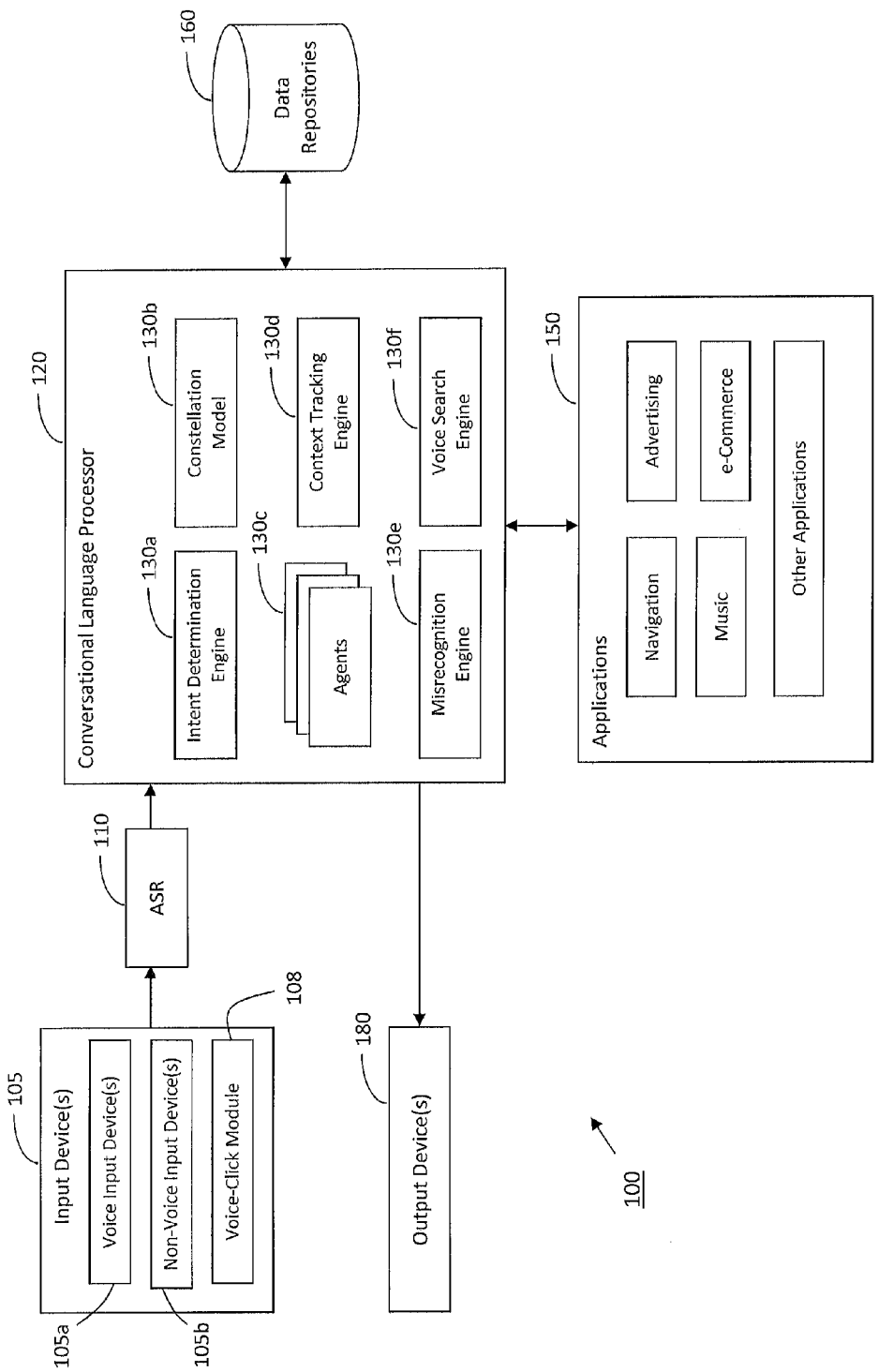
FIG. 1 illustrates a block diagram of an exemplary system for processing multi-modal device interactions in a natural language voice services environment, according to various aspects of the invention.

According to various aspects of the invention, FIG. 1 illustrates a block diagram of an exemplary system 100 for processing multi-modal device interactions in a natural language voice services environment. As will be apparent from the further description to be provided herein, the system 100 illustrated in FIG. 1 may include an input device 105, or a combination of input devices 105, which enable users to interact with the system 100 in a multi-modal manner. In particular, the system 100 may include various natural language processing components, including at least a voice-click module 108, which can collectively process a user's multi-modal interactions with one or more input devices 105. For example, in one implementation, the input devices 105 may include any suitable combination of at least one voice input device 105a (e.g., a microphone) and at least one non-voice input device 105b (e.g., a mouse, touch-screen display, wheel selector, etc.). As such, the input devices 105 may include any suitable combination of electronic devices having mechanisms for receiving both voice-based and non-voice-based inputs (e.g., a microphone coupled to one or more of a telematics device, personal navigation device, mobile phone, VoIP node, personal computer, media device, embedded device, server, or other electronic device). As such, the system 100 may enable users to engage in multi-modal conversational interactions with the one or more electronic input devices 105 or applications associated with the electronic devices 105, wherein the system 100 may process the device interactions in a free-form and cooperative manner suitable for routing tasks or otherwise resolving requests.

As indicated above, in one implementation, the system may include various natural language processing components that can support free-form utterances and/or other forms of device interactions, which may liberate users from restrictions relating to the manner of formulating commands, queries, or other requests. As such, users may interact with the input devices 105 using any manner of speaking into the voice input device 105a or otherwise interacting with the non-voice input devices 105b in order to request content or services available in the system 100. For instance, a user may request any content or services that may be available in the system 100 by providing a natural language utterance to the voice input device 105a. In one implementation, the utterance may then be processed using techniques described in U.S. Pat. No. 7,398,209, entitled "Systems and Methods for Responding to Natural Language Speech Utterance," issued Jul. 8, 2008, and U.S. patent application Ser. No. 10/618,633, entitled "Mobile Systems and Methods for Responding to Natural Language Speech Utterance," filed Jun. 15, 2003, the disclosures of which are hereby incorporated by reference in their entirety. In addition, the user may interact with one or more of the non-voice input devices 105b to provide further context or other information relating to the utterance and/or the requested content or services.

In one implementation, the system 100 may be coupled to various other systems that include additional multi-modal devices, with the other systems having natural language processing capabilities similar to those shown in FIG. 1. The system 100 may therefore provide an interface to a multi-device environment in which users may request content or services available through the various additional devices in the environment. For example, in one implementation, the system 100 may include a constellation model 130b that provides knowledge relating to content, services, applications, intent determination capabilities, and other features available through the other systems and devices in the environment. For example, in one implementation, the system 100 may interact with devices, applications, or other systems in the environment to cooperatively resolve requests, as described in co-pending U.S. patent application Ser. No. 12/127,343, entitled "System and Method for an Integrated, Multi-Modal, Multi-Device Natural Language Voice Services Environment," filed May 27, 2008, the disclosure of which is hereby incorporated by reference in its entirety. For example, the multi-device environment may share information among various systems and devices to provide a cooperative environment for resolving requests, wherein the shared information may relate to aspects such as device capabilities, context, prior interactions, domain knowledge, short-term knowledge, long-term knowledge, and cognitive models, among other things.

As indicated above, the system 100 illustrated in FIG. 1 may include, among other things, one or more electronic input devices 105 that collectively provide an interface (or combination of interfaces) for receiving one or more multi-modal device interactions from a user, wherein the device interactions include at least a user-spoken utterance. Although the implementation illustrated in FIG. 1 includes a distinct voice input device 105a and non-voice input device 105b, it will be apparent that in one or more implementations the voice input device 105a and the non-voice input device 105b may be components of the same or separate devices. For example, the input devices 105 may include a microphone coupled to a mobile phone (i.e., the voice input device 105a), and may further include one or more buttons, selectable displays, wheel selectors, or other components coupled to the mobile phone (i.e., the non-voice input devices 105b). In another example, the input devices 105 may include a combination of a microphone coupled to a telematics device (i.e., the voice input device 105a), and may further include buttons, a touch-screen display, a track wheel, or other non-voice input devices 105b coupled to a media player that is communicatively coupled to, yet distinct from, the telematics device. Thus, the input devices 105 may include any suitable combination of communicatively coupled electronic devices that includes at least one input device for receiving natural language utterance inputs and at least one input device for receiving multi-modal non-voice inputs.

In one implementation, a voice-click module 108 communicatively coupled to the one or more input devices 105 may enable cooperative processing of multi-modal device interactions received at the voice input device 105a and one or more of the non-voice input devices 105b. For example, the voice-click module 108 may provide the system 100 with information that can be used to process a natural language utterance received via the voice input device 105a in view of one or more non-voice device interactions received via the non-voice input devices 105b. The voice-click module 108 therefore enables the user to interact with the various input devices 105 in an intuitive and free-form manner, whereby the user may provide various types of information to the system 100 when seeking to initiate action, retrieve information, or otherwise request content or services available in the system 100.

The voice input device 105a may comprise any appropriate device, or combination of devices, which have capabilities for receiving natural language utterances or other forms of spoken input. For example, in one implementation, the voice input device 105a may include a directional microphone, an array of microphones, or other devices capable of creating encoded speech. In one implementation, the voice input device 105a may be configured to maximize fidelity of the encoded speech. For example, the voice input device 105a may be configured to maximize gain in a direction of the user, cancel echoes, null point noise sources, perform variable rate sampling, filter environmental noise or background conversations, or use other techniques to maximize the fidelity of the encoded speech. As such, the voice input device 105a may create the encoded speech in a manner tolerant of noise or other factors that could otherwise interfere with the system 100 accurately interpreting natural language utterances.

The non-voice input device 105b may comprise any appropriate device, or combination of devices, which have capabilities for supporting non-voice device interactions. For example, in one implementation, the non-voice input device 105b may include a combination stylus and touch-screen or tablet interface, a BlackBerry® wheel selector, an iPod® click wheel, a mouse, a keypad, buttons, or any other devices that supports distinguishable non-voice device interactions. The user may therefore use the non-voice input devices 105b to make data selections or identify a point of focus (or attention focus) to be processed in connection with a related natural language utterance provided via the voice input device 105a. For example, the user may point a stylus at a specific segment of a touch-screen display, highlight text using a mouse, click a button, interact with an application, or otherwise engage in any suitable device interaction for selecting data or otherwise identifying a point of focus (i.e., voice-activating or "voice-clicking" the selected data and/or the identified point of focus).

Furthermore, in addition to being usable for making data selections, identifying points of focus, or otherwise activating data to be interpreted in association with one or more utterances, the user may further use the non-voice input devices 105b to engage in specialized device interactions that have meaning in the system 100. For example, the specialized device interactions (which may be referred to as "clicks" or "voice-clicks") may include clicks lasting a given duration, clicks continuously held for a given duration, clicks made in a predetermined sequence, or any other interaction or sequence of interactions that the input devices 105 and/or the voice-click module 108 can identify, detect, or otherwise distinguish.

In one implementation, the specialized device interactions may be associated with one or more actions, queries, commands, tasks, or other requests associated with applications or services available in the system 100. In one implementation, the specialized device interactions may further include one or more actions, queries, commands, tasks, or other requests associated with any of various devices deployed in the multi-device environment, as described in the above-referenced co-pending U.S. patent application Ser. No. 12/127,343, entitled "System and Method for an Integrated, Multi-Modal, Multi-Device Natural Language Voice Services Environment," filed May 27, 2008. For example, a distinct sequence of clicking a stylus on a particular segment or item displayed on a touch-screen display may be defined as a specialized device interaction or voice-click for initiating a telephone call on a mobile phone, calculating a route on a navigation device, purchasing a song to a media player, or another type of request.

Thus, the voice-click module 108 coupled to the input device 105 may continually monitor the user's interactions with the non-voice input device 105b to detect occurrences of at least one non-voice device interaction, which may be referred to herein as a "voice-click." The detected voice-click may therefore provide further context for processing a multi-modal device interaction, which may include the at least one voice-click and one or more natural language utterances, each of which may provide context for task specification. Thus, the voice-click may generally signal the system 100 that a current utterance or other voice-based input is to be processed together with a current interaction with one or more of the devices 105. For example, in one implementation, the current device interaction may include the user selecting, highlighting, or otherwise identifying a particular point of attention, object, or other item associated with one or more of the devices 105. As such, the current device interaction may provide context for sharpening recognition, interpretation, and understanding of the accompanying utterance, and moreover, the current utterance may provide information to enhance the context provided by the accompanying device interaction.

In one implementation, the voice-click module 108 may determine the various voice-click interactions to be detected based on particular characteristics of the non-voice input devices 105b (e.g., the voice-click interactions may include distinguishable interactions that the non-voice input devices 105b support). For example, a multi-touch display typically includes a touch-screen display device configured to support various distinguishable gestures for interacting with information displayed therein (e.g., a user may zoom in, zoom out, rotate, or otherwise control graphical information displayed on a multi-touch screen using specific gestures or other interaction techniques). Thus, in one example, the non-voice input devices 105b may include a multi-touch display, in which case the voice-click module 108 may be configured to detect an occurrence of a voice-click when a user engages in one or more of the distinguishable gestures supported by the non-voice multi-touch display 105b.

In one implementation, a user may customize or otherwise modify the voice-click interactions to be detected by the voice-click module 108. In particular, the specific device interactions detected by the voice-click module 108 may be removed or modified, or new device interactions may be added. As such, the voice-click device interactions detected by the voice-click module 108 may include any appropriate interaction or combination of interactions that the non-voice input devices 105b and/or the voice-click module 108 can distinguish.

When the voice-click module 108 detects a user's engaging in a voice-click device interaction, the voice-click module 108 may extract context information associated with the voice-click device interaction for voice-activation. In particular, the voice-click module 108 may identify information relating to a segment, item, point of focus, attention focus, or other data selected by the user, or otherwise identify information relating to a particular device interaction or sequence of device interactions engaged in by the user. The voice-click module 108 thus extracts the identified information relating to the detected voice-click, which may be used as context information to be associated with one or more prior, contemporaneous, or subsequent natural language utterances.

Thus, in response to the voice-click module 108 detecting a voice-click (e.g., selection of an icon, a section of text, specific coordinates on a map display, or other information), the voice-click module 108 may signal the system 100 to use a natural language utterance voice input (which may be received via the voice input device 105a) as further context for determining an action, query, command, task, or other request to perform in order to service the detected voice-click. As such, the various natural language processing components in the system 100 may use the combined context of the voice-click and the accompanying natural language utterance to determine the intent of the voice-click device interaction, and to appropriately route one or more actions, queries, commands, tasks, or other requests to any of the various devices deployed in the multi-device environment.

For instance, in one implementation, the multi-device environment may include a voice-enabled navigation device. Thus, an exemplary voice-click device interaction may include a user touching a stylus to a specific intersection displayed on a touch-screen display 105b associated with the voice-enabled navigation device, while also providing an utterance such as "What restaurants are around here?" into a microphone 105a. In this example, the voice-click module 108 may extract information relating to the voice-clicked intersection, which may be used as context for processing the accompanying utterance (i.e., the selected intersection may provide context for interpreting "around here," as opposed to the user's current location or some other meaning). Moreover, as indicated above, the voice input may be used as additional context for determining task specification. Thus, the utterance may be further processed for recognition and conversational interpretation using the various natural language processing components of the system 100, as described in greater detail below.

In one implementation, an Automatic Speech Recognizer (ASR) 110 may generate one or more preliminary interpretations of the utterance received via the voice input device 105a. For example, the ASR 110 may recognize syllables, words, phrases, or other acoustic characteristics of the utterance using one or more dynamically adaptable recognition grammars. In one implementation, the dynamic recognition grammars may be used to recognize a stream of phonemes using phonetic dictation based on one or more acoustic models (e.g., as described in co-pending U.S. patent application Ser. No. 11/197,504, entitled "Systems and Methods for Responding to Natural Language Speech Utterance," filed Aug. 5, 2005, the disclosure of which is hereby incorporated by reference in its entirety).

In one implementation, the ASR 110 may be configured to perform multi-pass speech recognition, where a primary speech recognition engine may generate a primary transcription of the utterance (e.g., using a large list dictation grammar), and may subsequently request one or more secondary transcriptions from one or more secondary speech recognition engines (e.g., using a virtual dictation grammar having decoy words for out-of-vocabulary words). In one implementation, the primary speech recognition engine may request the secondary transcriptions based on a confidence level for the primary transcription.

The recognition grammars employed in the ASR 110 may include various vocabularies, dictionaries, syllables, words, phrases, or other information for recognizing utterances. In one implementation, information contained in the recognition grammars may be dynamically optimized to improve a likelihood of accurate recognition for a given utterance (e.g., following an incorrect interpretation of a word or phrase, the incorrect interpretation may be removed from the grammar to reduce a likelihood of repeating the incorrect interpretation). Additionally, various forms of knowledge can be used to continually optimize the information contained in the recognition grammars on a dynamic basis. For example, the system 100 may have knowledge that includes environmental knowledge (e.g., peer-to-peer affinities, capabilities of the various devices in the environment, etc.), historical knowledge (e.g., frequent requests, prior context, etc.), or short term shared knowledge relating to a current conversational dialogue or interaction, among other types of knowledge.

In one implementation, the information in the recognition grammars may be further optimized according to context or application-specific domains. In particular, similar utterances may be interpreted differently depending on a context to which the utterance relates, including navigation, music, movies, weather, shopping, news, languages, temporal or geographic proximities, or other contexts or domains. For example, an utterance containing the word "traffic" may be subject to different interpretations depending on whether the context relates to navigation (i.e., road conditions), music (i.e., the 1960's rock band), or movies (i.e., the film directed by Steven Soderbergh). Accordingly, the ASR 110 may use various techniques to generate a preliminary interpretation of the natural language utterance, such as those described in the above-referenced co-pending U.S. Patent Applications and/or co-pending U.S. patent application Ser. No. 11/513,269, entitled "Dynamic Speech Sharpening," filed Aug. 31, 2006, the disclosure of which is hereby incorporated by reference in its entirety.

As such, the ASR 110 may provide one or more preliminary interpretations of the natural language utterance included in the voice-click to a conversational language processor 120. The conversational language processor 120 may include various natural language processing components collectively configured to model human-to-human conversations or interactions. For example, the conversational language processor 120 may include, among other things, an intent determination engine 130a, a constellation model 130b, one or more context domain agents 130c, a context tracking engine 130d, a misrecognition engine 130e, and a voice search engine 130f. Furthermore, the conversational language processor 120 may be coupled to one or more data repositories 160 and one or more applications 150 associated with various contexts or domains.

Thus, the system 100 may use the various natural language processing components associated with the conversational language processor 120 in order to engage the user in a cooperative conversation and resolve voice-click device interactions based on the user's intent in initiating the voice-click. More particularly, the intent determination engine 130a may establish meaning for a given multi-modal device interaction based on capabilities of the system 100 as well as the capabilities of any other devices in the multi-device environment. For instance, referring to the example above where the user voice-clicked a particular intersection to determine "What restaurants are around here," the conversational language processor 120 may determine a conversational goal of the voice-click (e.g., "What" may indicate that the utterance relates to a query requesting data retrieval). In addition, the conversational language processor 120 may invoke the context tracking engine 130d to determine context for the voice-click. For example, to determine the voice-click context, the context tracking engine 130d may combine the context associated with the identified point of focus (i.e., the selected intersection) with context associated with the utterance (i.e., restaurants).

As a result, the combined context of the voice-click (which includes both the device interaction and the accompanying utterance) may provide sufficient information for routing a specific query. For example, the query may include various parameters or criteria relating to restaurants and the identified intersection. The conversational language processor 120 may then select a particular device, application, or other component to which the query may be routed for processing. For example, in one implementation, the conversational language processor 120 may evaluate the constellation model 130b, which contains a model of capabilities for each device in the multi-device environment. In one implementation, the constellation model 130b may contain, among other things, knowledge of processing and storage resources available to each of the devices in the environment, as well as the nature and scope of domain agents, context, capabilities, content, services, or other information for each of the devices.

As such, using the constellation model 130b and/or other information, the conversational language processor 120 may determine which device or combination of devices has suitable capabilities that can be invoked to process a given voice-click device interaction. For instance, again referring to the example given above, the conversational language processor 120 may determine that the context of the voice-click relates to an interaction with a navigation device and therefore route the query for processing using a navigation application 150. Results of the query may then be processed (e.g., to weigh the results based on knowledge of the user, such as a preference for vegetarian restaurants) and returned to the user via an output device 180.

Figure 2:
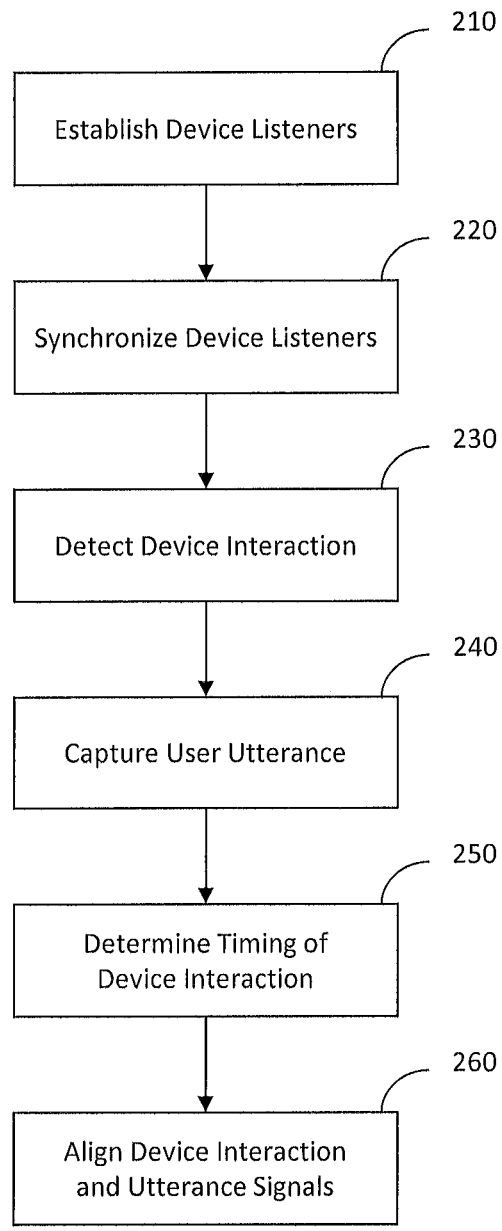
FIG. 2 illustrates a block diagram of an exemplary method for synchronizing multi-modal devices in a natural language voice service environment, according to various aspects of the invention.

According to various aspects of the invention, FIG. 2 illustrates a block diagram of an exemplary method for synchronizing multi-modal devices in a natural language voice service environment. As described above, multi-modal device interactions (or "voice-clicks") may generally occur when a user engages in one or more interactions with one or more multi-modal devices while also providing one or more natural language utterances that relate to the interactions with the multi-modal devices. In one implementation, context information relating to the interactions with the multi-modal devices may be combined with context information relating to the natural language utterances to determine an intent of the voice-click (e.g., to initiate a particular action, query, command, task, or other request).

In one implementation, various natural language processing components may be configured to continually listen or otherwise monitor the multi-modal devices to determine when voice-clicks occur. As such, the method illustrated in FIG. 2 may be used to calibrate or otherwise configure the components responsible for continually listening or otherwise monitoring the multi-modal devices. For example, in one implementation, the natural language voice service environment may include a plurality of multi-modal devices that provide different capabilities or services, and the user may engage in one or more voice-clicks to request services relating to any of the various devices or capabilities in any given device interaction.

To enable continuous listening for multi-modal device interactions or voice-clicks, each of the plurality of devices in the environment may be configured to receive information relating to a voice-click. Thus, in one implementation, an operation 210 may include establishing device listeners for each of the plurality of devices in the environment. Additionally, operation 210 may be performed in response to one or more new devices being added to the environment. The device listeners established in operation 210 may include any suitable combination of instructions, firmware, or other routines configured to be executed on one or more processing devices or other hardware components. For each device in the environment, the associated device listener may communicate with the device to determine capabilities, features, supported domains, or other information associated with the device. In one implementation, the device listeners may be configured to communicate with the device using the Universal Plug and Play protocol designed for ancillary computer devices. It will be apparent, however, that any suitable mechanism for communicating with the multi-modal devices may be used.

When device listeners have been established for each of the devices in the environment (or when device listeners have been established for new devices added to the environment), the various device listeners may be synchronized in an operation 220. In particular, each of the various devices may have different internal clocks or other timing mechanisms, wherein operation 220 may include synchronizing the various device listeners according to the respective internal clocks or timing mechanisms of the devices. In one implementation, synchronizing the device listeners may include each of the respective device listeners publishing information relating to the internal clock or timing of the associated device.

Thus, when one or more multi-modal interactions or voice-clicks subsequently occur for one or more of the devices, the associated device listener may detect information associated with the voice-click in an operation 230. For example, in one implementation, the various device listeners established in operation 210 may be associated with the voice-click module described above and illustrated in FIG. 1. Operation 230 may therefore include one or more of the device listeners or the voice-click module detecting an occurrence of a user interacting with one or more of the devices (e.g., selecting data associated with the device, identifying a point of focus or attention focus associated with the device, or otherwise engaging in one or more interactions or sequences of interactions with the device). Furthermore, an operation 240 may then comprise capturing an utterance from the user that relates to the device interaction detected in operation 230.

For example, a user viewing a web page presented on a display device may see a product name on the web page and desire more information about purchasing the product. The user may select text from the web page that contains the product name (e.g., using a mouse or keyboard to highlight the text), and then initiate a voice-click to ask "Is this available on Amazon.com?" In this example, operation 230 may include a device listener associated with the display device detecting the selection of the text associated with the product name, while operation 240 may include capturing the utterance inquiring about the availability of the product on Amazon.com.

As described above, each device that receives an input from the user may have an internal clock or timing mechanism. In an operation 250, each device may therefore determine when the input was received from a local perspective, and notify the voice-click module that the input was received. In particular, a given voice-click may include at least a natural language utterance received via a voice input device in addition to one or more further interactions with one or more other devices. The utterance may be received prior to, contemporaneously with, or subsequent to the device interactions, whereby operation 250 includes determining the timing of the device interaction for correlation with the associated utterance. In particular, using the device listener signals synchronized as described in reference to operation 220, an operation 260 may include aligning the signals for the device interactions and the utterance. In matching the device interaction and utterance signals, a voice-click input may be generated that includes aligned voice and non-voice components. The voice-click input may then be subject to further natural language processing, as described in greater detail below.

Figure 3:
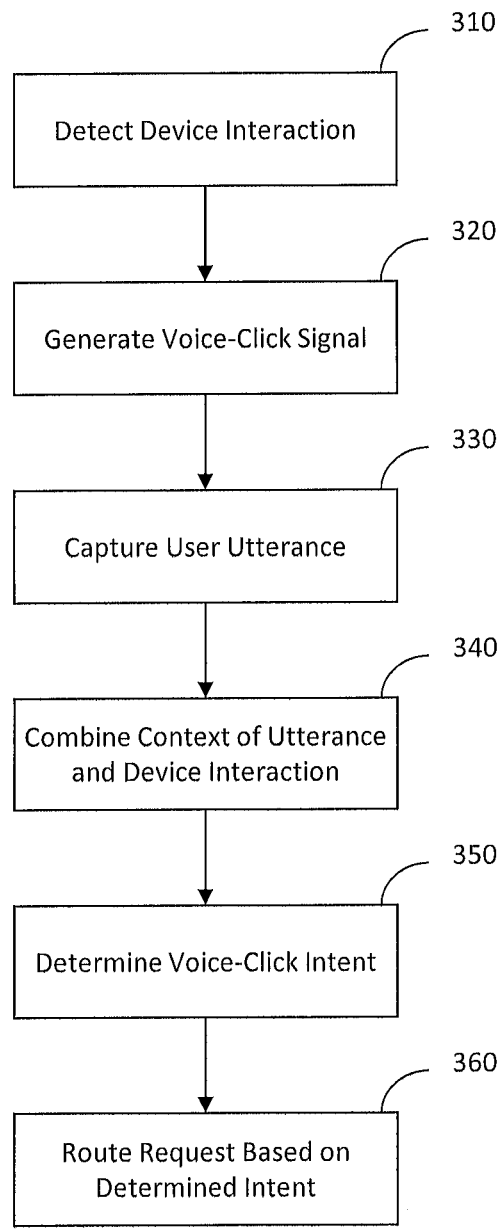
FIG. 3 illustrates a flow diagram of an exemplary method for processing multi-modal device interactions in a natural language voice service environment, according to various aspects of the invention.

According to various aspects of the invention, FIG. 3 illustrates a flow diagram of an exemplary method for processing multi-modal device interactions in a natural language voice service environment. As described above, multi-modal device interactions (or "voice-clicks") may generally occur when a user interacts with one or more multi-modal devices while also providing one or more natural language utterances related to the device interactions. As such, in one implementation, the method illustrated in FIG. 3 may be performed when one or more natural language processing components continually listen or otherwise monitor the one or more multi-modal devices to determine when one or more voice-clicks occur.

In one implementation, one or more device interactions may be defined as initiating a voice-click. For example, any given electronic device may generally support various distinguishable interactions, which may result in a given action, command, query, or other request being executed. Thus, in one implementation, any appropriate combination of device interactions that a given electronic device can uniquely recognize or otherwise use to generate a uniquely recognizable signal may be defined as a voice-click, wherein the voice-click may provide a signal indicating that a natural language utterance is to be processed together with context associated with the relevant device interactions. For example, devices that have a four-way or a five-way navigation button may support specific distinguishable interactions, wherein pressing the navigation button in a particular way may cause a specific task or other action to be performed, such as controlling a map display or calculating a route. In another example, a BlackBerry® device having a wheel selector may support interactions such as wheeling a cursor over a particular point of focus or attention focus, pressing the wheel to select specific data or a given application, or various other interactions. Various other device interactions may be used to indicate when a natural language utterance is to be processed together with context associated with the device interactions, without limitation, wherein the specific device interactions may vary in any given implementation. For example, the relevant device interactions may further include one or more of gesturing with a pointing or drawing instrument on a touch-sensitive screen (e.g., drawing an ear-shaped squiggle), a unique interaction method such as a long touch or double-tap, and/or if the system is operating in the continuous listening mode described above, a predefined contextual command word may indicate that a current device context is to be processed with a portion of the voice-based input that follows the contextual command word (e.g., the command word be "OK," "Please," "Computer," or another suitable word, wherein a user may select a specific point on a map and say "Please zoom in," or say "OK read it" when an e-mail is displayed, etc.).

As such, an operation 310 may include processing multi-modal device interactions in a natural language voice service environment to detect an occurrence of one or more device interaction that signal initiation of a voice-click. In particular, the device interactions detected in operation 310 may include any suitable interactions that cause an electronic device to generate a unique, recognizable, or otherwise distinguishable signal that relates to a user selecting data, identifying a point of focus or attention focus, invoking an application or task, or interacting with the device in another way, depending on the specific capabilities of the device.

In addition to the specific signal that the device generates in response to the user interaction, the interaction detected in operation 310 may signal initiation of a voice-click, whereby a prior, contemporaneous, or subsequent natural language voice input will provide further context for interpreting the device interaction detected in operation 310. For example, a natural language processing system may generally be configured to accept a voice input when particular device interactions occur (e.g., pressing a button to turn on a microphone). Thus, in the method illustrated in FIG. 3, the device interactions that signal an incoming voice input may further include any suitable interaction or combination of interactions with an electronic device, including interactions associated with a user selecting data, identifying a point of focus or attention focus, invoking an application or task, or interacting with the device in another way, depending on the specific capabilities of the device.

As such, when a voice-click device interaction has been detected in operation 310, a voice-click signal may be generated in an operation 320 to indicate that a natural language voice input should be associated with the interaction detected in operation 320. Subsequently, an operation 330 may include capturing a user utterance to be associated with the interaction detected in operation 310. In one implementation, the interaction detected in operation 310 may signal that a subsequent voice input will be provided, but it will be apparent that in one or more implementations the utterance captured in operation 330 may be provided prior to or contemporaneously with the interaction detected in operation 310 (e.g., a user may provide an utterance such as "Look up this artist on iTunes®" and subsequently voice-click the artist's name on a media player, or the user may provide the utterance while voice-clicking the artist's name, or the user may voice-click the artist's name and then provide the utterance).

When information relating to the voice-click device interactions and associated natural language utterance have been received, an operation 340 may include extracting and combining context information for the device interactions and the associated utterance. In particular, the context information extracted from the voice-click device interactions may include information relating to a segment, item, point of focus, attention focus, or data selected by the user, or to a particular device interaction or sequence of device interactions engaged in by the user. The extracted context for the device interaction may then be combined with context extracted for the natural language utterance captured in operation 330, wherein the combined context information may be used to determine an intent of the voice-click in an operation 350.

For example, in an exemplary voice-click device interaction, a user may be selectively copying a music collection from a media player to a backup storage device. While browsing the music on the media player, the user may encounter a particular song and voice-click the song while saying "Copy this whole album" (e.g., by pressing a particular button on the media player for an extended period of time while highlighting the song). In this example, operation 310 may include detecting the interaction of the extended button press, which causes the voice-click signal to be generated in operation 320. The utterance of "Copy this whole album" may then be captured in operation 330, and context information associated with the voice-click device interaction and the utterance may be combined in operation 340. In particular, the context of the device interaction may include information relating to the selected song, among other things (e.g., the context may further include information contained in metadata associated with the song, such as an ID3 tag for music files). Furthermore, the context of the utterance may include information identifying a copy operation and an album that contains the selected song.

As such, context information relating to voice-click interactions with the multi-modal devices may be combined with context information relating to the natural language utterances, whereby an operation 350 may determine the intent of the voice-click interaction. For instance, referring to the example above, the intent determined in operation 350 may include an intent to copy an album that contains the highlighted song from the media player to the backup storage device. Thus, in response to determining the intent of the voice-click in operation 350, one or more requests may be appropriately routed in an operation 360. In the example being discussed herein, operation 360 may include routing one or more requests to the media player to identify all of the data associated with the album that contains the highlighted song, and one or more requests to any appropriate combination of devices that can manage copying of the identified data from the media player to the backup storage device (e.g., a personal computer that interfaces with both the media player and the storage device).

Figure 4:
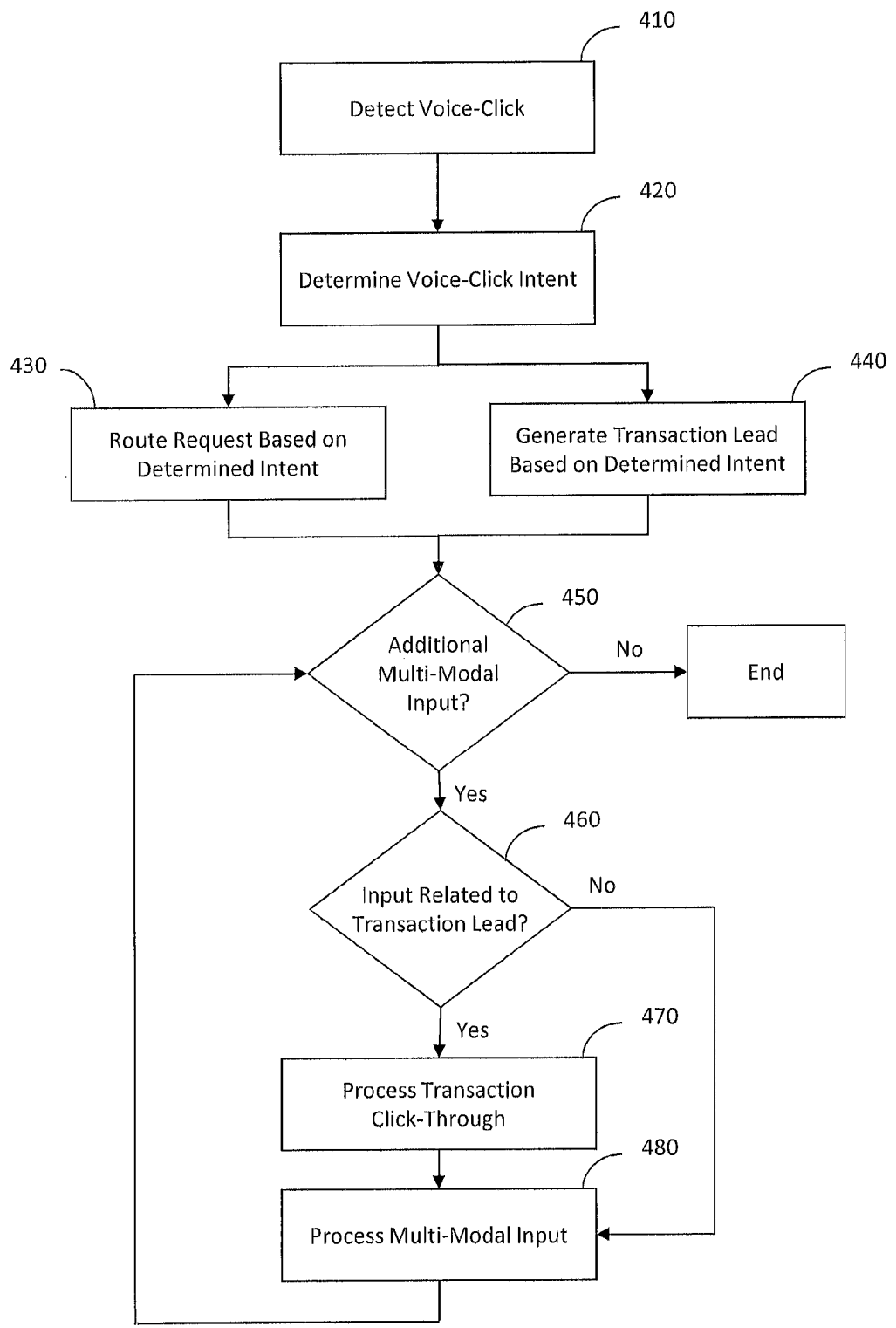
FIG. 4 illustrates a flow diagram of an exemplary method for processing multi-modal device interactions to generate one or more transaction leads in a natural language voice service environment, according to various aspects of the invention.

According to various aspects of the invention, FIG. 4 illustrates a flow diagram of an exemplary method for processing multi-modal device interactions to generate a transaction lead or "click-through" in a natural language voice service environment. In particular, the method illustrated in FIG. 4 may be used to generate a transaction lead or click-through in combination with one or more actions performed in response to one or more voice-click device interactions being detected.

For example, an operation 410 may include detecting one or more voice-click device interactions received from a user, wherein the voice-click device interactions may comprise any suitable combination of one or more device interactions coupled with one or more related natural language utterances. The user's intent in engaging in the voice-click device interactions may then be determined in an operation 420, and a subsequent operation 430 may include routing one or more requests to one or more processing devices based on the determined intent in order to resolve the voice-click interaction. In one implementation, operations 410, 420, and 430 may be performed in a manner similar to that described above in reference to FIG. 2 and FIG. 3, whereby signals for the device interactions may be aligned with signals for one or more natural language utterances and context information may be extracted from the signals to determine the intent of the voice-click device interaction.

In addition to routing one or more requests based on the user's intent, the method illustrated in FIG. 4 may further comprise generating one or more transaction leads that may result in one or more click-throughs. For example, a click-through may generally refer to an instance of a user clicking or otherwise selecting an electronic advertisement to access one or more services associated with the advertiser. In many electronic systems, click-throughs or click-through rates can provide mechanisms for measuring a user's interactions with an electronic advertisement, which may provide various measurements that advertisers can use to determine an amount to pay an entity that delivers the advertisement to users.

As such, the method illustrated in FIG. 4 may generate transaction leads, including advertisements or recommendations, whereby a user's voice-based input combined with a specific device interaction may provide further focus for generating transaction leads. In this manner, the advertisements or recommendations provided to the user may be more relevant to specific information with which the user may be interacting. Furthermore, using natural language cognitive models and shared knowledge relating to a user's preferences may provide further context for targeted transaction leads tailored to the specific user, which may thus be more likely to result in a click-through that can generate payment for a voice services provider.

Thus, in addition to routing one or more requests based on the user's intent in engaging in the voice-click device interaction, an operation 440 may include generating one or more transaction leads based on the determined intent. In particular, based on the combined context of the device interaction and the associated natural language utterance, the transaction leads may be processed in a manner "closer" to the user, in that local voice and non-voice context can be used as state data in any appropriate system that performs targeted advertising. For instance, referring to the example given above where a user selects an intersection displayed on a navigation device while saying "Find restaurants are around here," the transaction leads generated in operation 440 may include one or more advertisements or recommendations for restaurants near the intersection, which may be targeted to the user based on knowledge of the user's short-term and long-term preferences (e.g., a preferred type of restaurant, a preferred price range, etc.).

The transaction leads may then be presented to the user (e.g., as selectable points on a map display). The user's subsequent multi-modal device interactions may then be monitored in an operation 450 to determine whether or when one or more further multi-modal device interactions occur. If no further interactions occur, a determination may be made that the user did not act on the transaction lead and the process may then end. If an additional multi-modal interaction does occur, however, the multi-modal input may be processed in an operation 480 to determine an intent of the input and route one or more requests accordingly. In addition, an operation 460 may include determining whether the multi-modal input relates to the transaction lead generated in operation 440. For example, the user may select one of the advertised or recommended restaurants by providing an utterance, a non-voice device interaction, or a voice-click device interaction requesting further action or information relating to the transaction lead. In such a case, an operation 470 may further include processing a transaction click-through in relation to the transaction lead generated in operation 440, wherein the transaction click-through may be used to determine payment or otherwise generate revenue for a particular entity (e.g., a provider of the voice services or another entity associated with the transaction lead or transaction click-through).

Implementations of the invention may be made in hardware, firmware, software, or various combinations thereof. The invention may also be implemented as instructions stored on a machine-readable medium, which may be read and executed by one or more processors. A machine-readable medium may include various mechanisms for storing or transmitting information in a form readable by a machine (e.g., a computing device). For example, a machine-readable storage medium may include read only memory, random access memory, magnetic disk storage media, optical storage media, flash memory devices, or other storage media, and a machine-readable transmission media may include forms of propagated signals, such as carrier waves, infrared signals, digital signals, or other transmission media. Further, firmware, software, routines, or instructions may be described in the above disclosure in terms of specific exemplary aspects and implementations of the invention, and performing certain actions. However, it will be apparent that such descriptions are merely for convenience, and that such actions in fact result from computing devices, processors, controllers, or other devices executing the firmware, software, routines, or instructions.

Although the descriptions provided herein have generally focused on techniques for processing multi-modal device interactions in a natural language voice services environment, it will be apparent that various further natural language processing capabilities may be used in connection with, in addition to, or in lieu of those described in connection with the specific aspects and implementations discussed herein. For example, in addition to the techniques described in the co-pending U.S. Patent Applications referenced above, the systems and methods described herein may further utilize natural language processing capabilities as described in co-pending U.S. patent application Ser. No. 11/197,504, entitled "Systems and Methods for Responding to Natural Language Speech Utterance," filed Aug. 5, 2005, U.S. patent application Ser. No. 11/200,164, entitled "System and Method of Supporting Adaptive Misrecognition in Conversational Speech," filed Aug. 10, 2005, U.S. patent application Ser. No. 11/212,693, entitled "Mobile Systems and Methods of Supporting Natural Language Human-Machine Interactions," filed Aug. 29, 2005, U.S. patent application Ser. No. 11/580,926, entitled "System and Method for a Cooperative Conversational Voice User Interface," filed Oct. 16, 2006, U.S. patent application Ser. No. 11/671,526, entitled "System and Method for Selecting and Presenting Advertisements Based on Natural Language Processing of Voice-Based Input," filed Feb. 6, 2007, and U.S. patent application Ser. No. 11/954,064, entitled "System and Method for Providing a Natural Language Voice User Interface in an Integrated Voice Navigation Services Environment," filed Dec. 11, 2007, the disclosures of which are hereby incorporated by reference in their entirety.

Accordingly, aspects and implementations of the invention may be described herein as including a particular feature, structure, or characteristic, but it will be apparent that every aspect or implementation may or may not necessarily include the particular feature, structure, or characteristic. In addition, when a particular feature, structure, or characteristic has been described in connection with a given aspect or implementation, it will be understood that such feature, structure, or characteristic may be included in connection with other aspects or implementations, whether or not explicitly described. Thus, various changes and modifications may be made to the preceding description without departing from the scope or spirit of the invention, and the specification and drawings should therefore be regarded as exemplary only, with the scope of the invention determined solely by the appended claims.

What is claimed is:

1. A method for facilitating natural language processing of user inputs via multiple input modes where each user input alone may be insufficient to completely and/or accurately determine a user request intended by a user, the method being implemented by a computer system that includes one or more physical processors executing computer program instructions which, when executed, perform the method, the method comprising:

receiving, at the computer system, a first user input of a user from a first input device via a first input mode, wherein the first user input is generated responsive to the user interacting with the first input device in a manner corresponding to the first input mode to provide the first user input;

receiving, at the computer system, a second user input of the user from a second input device via a second input mode, wherein the second user input is generated responsive to the user interacting with the second input device in a manner corresponding to the second input mode to provide the second user input, wherein the first user input and the second user input are related to one another, and wherein one of the first user input or the second user input comprises a voice input received from at least one of the first input device or the second input device via a voice input mode, and the other one of the first user input or the second user input comprises a non-voice input received from at least one of the first input device or the second input device via a non-voice input mode;

determining, by the computer system, based on the second user input, context information for interpreting the first user input, wherein the context information identifies a first item of a first item type;

determining, by the computer system, further context information based on the first user input, wherein the further context information identifies a second item of a second item type that is related to the first item of the first item type;

generating, by the computer system, a query based on the context information and the further context information to obtain one or more intermediary results, wherein the generated query comprises a query related to the second item of the second item type;

determining, by the computer system, a user request based on the one or more intermediary results;

providing, by the computer system, a response to the user request; and providing, by the computer system, based on at least one of the context information for interpreting the first user input or the further context information, an advertisement for presentation to the user.

2. The method of claim 1, further comprising:
providing, by the computer system, the context information for interpreting the first user input to an advertiser system; and
obtaining, by the computer system, the advertisement from the advertiser system responsive to providing the context information to the advertiser system,
wherein providing the advertisement comprises providing the advertisement obtained from the advertiser system.

3. The method of claim 1, wherein the context information for interpreting the first user input is used as input for selecting the advertisement, and wherein providing the advertisement comprises providing the selected advertisement.

4. The method of claim 1, wherein information about the user request is used as input for selecting the advertisement, and wherein providing the advertisement comprises providing the selected advertisement.

5. The method of claim 1, wherein the first user input comprises the voice input received via the voice input mode, and the second user input comprises the non-voice input received via the non-voice input mode,
wherein determining the context information comprises determining, based on the non-voice input, the context information for interpreting the voice input,
wherein determining the user request comprises determining the user request based on the voice input and the context information for interpreting the voice input, and
wherein providing the advertisement comprises providing the advertisement based on the context information for interpreting the voice input.

6. The method of claim 5, wherein the context information for interpreting the voice input is used as input for selecting the advertisement, and wherein providing the advertisement comprises providing the selected advertisement.

7. The method of claim 5, further comprising:
processing, by the computer system, the voice input to recognize one or more words of the voice input;
interpreting, by the computer system, the one or more recognized words based on the context information determined from the non-voice input for interpreting the voice input,
wherein determining the user request comprises determining the user request based on the interpretation of the one or more recognized words.

8. The method of claim 7, wherein at least one of the one or more recognized words is associated with at least two meanings,
wherein interpreting the one or more recognized words comprises selecting, based on the context information determined from the non-voice input for interpreting the voice input, one of the at least two meanings associated with the at least one recognized word to determine the user request.

9. The method of claim 1, wherein the first user input comprises the non-voice input received via the non-voice input mode, and the second user input comprises the voice input received via the voice input mode,
wherein determining the context information comprises determining, based on the voice input, the context information for interpreting the non-voice input,
wherein determining the user request comprises determining the user request based on the non-voice input and the context information for interpreting the non-voice input, and
wherein providing the advertisement comprises providing the advertisement based on the context information for interpreting the non-voice input.

10. The method of claim 9, wherein the context information for interpreting the non-voice input is used as input for selecting the advertisement, and wherein providing the advertisement comprises providing the selected advertisement.

11. The method of claim 1, wherein the first item of the first item type comprises one of a command or a music-related product, and the second item of the second item type comprises the other one of the command or the music-related product.

12. The method of claim 1, further comprising:
determining, by the computer system, prior context information associated with one or more prior voice inputs, wherein the one or more prior voice inputs are received by the computer system before the voice input is received, and
wherein determining the user request comprises determining the user request further based on the prior context information.

13. The method of claim 1, wherein the context information for interpreting the first user input comprises information identifying at least one of a product, a service, a place, a location, an entity, or a content item.

14. The method of claim 1, wherein the receipt of first user input is prior to, contemporaneously with, or subsequent to the receipt of the second user input.

15. A system for facilitating natural language processing of user inputs via multiple input modes where each user input alone may be insufficient to completely and/or accurately determine a user request intended by a user, the system comprising:

one or more physical processors programmed with computer program instructions which, when executed, cause the one or more physical processors to:

receive a first user input of a user from a first input device via a first input mode, wherein the first user input is generated responsive to the user interacting with the first input device in a manner corresponding to the first input mode to provide the first user input;

receive a second user input of the user from a second input device via a second input mode, wherein the second user input is generated responsive to the user interacting with the second input device in a manner corresponding to the second input mode to provide the second user input, wherein the first user input and the second user input are related to one another, and wherein one of the first user input or the second user input comprises a voice input received from at least one of the first input device or the second input device via a voice input mode, and the other one of the first user input or the second user input comprises a non-voice input received from at least one of the first input device or the second input device via a non-voice input mode;

determine, based on the second user input, context information for interpreting the first user input, wherein the context information identifies a first item of a first item type;

determine further context information based on the first user input, wherein the further context information identifies a second item of a second item type that is related to the first item of the first item type;

generate a query based on the context information and the further context information to obtain one or more intermediary results, wherein the generated query comprises a query related to the second item of the second type;

determine a user request based on the one or more intermediary results;

provide a response to the user request; and provide, based on at least one of the context information for interpreting the first user input or the further context information, an advertisement for presentation to the user.

16. The system of claim 15, wherein the first item of the first item type comprises one of a command or a music-related product, and the second item of the second item type comprises the other one of the command or the music-related product.

17. The system of claim 15, further comprising:

provide the context information for interpreting the first user input to an advertiser system; and obtain the advertisement from the advertiser system responsive to providing the context information to the advertiser system, wherein providing the advertisement comprises providing the advertisement obtained from the advertiser system.

18. The system of claim 15, wherein the context information for interpreting the first user input is used as input for selecting the advertisement, and wherein providing the advertisement comprises providing the selected advertisement.

19. The system of claim 15, wherein information about the user request is used as input for selecting the advertisement, and wherein providing the advertisement comprises providing the selected advertisement.

20. The system of claim 15, wherein the first user input comprises the voice input received via the voice input mode, and the second user input comprises the non-voice input received via the non-voice input mode, wherein determining the context information comprises determining, based on the non-voice input, the context information for interpreting the voice input, wherein determining the user request comprises determining the user request based on the voice input and the context information for interpreting the voice input, and wherein providing the advertisement comprises providing the advertisement based on the context information for interpreting the voice input.

* * * * *